US012658620B2

(12) United States Patent
Yang et al.

(10) Patent No.: US 12,658,620 B2
(45) Date of Patent: Jun. 16, 2026

(54) CARD EDGE CONNECTOR WITH REDUCED HEIGHT

(71) Applicant: Amphenol Commercial Products (Chengdu) Co., Ltd., Chengdu (CN)

(72) Inventors: Kui Yang, Chengdu (CN); Xiaodong Hu, Chengdu (CN)

(73) Assignee: Amphenol Commercial Products (Chengdu) Co., Ltd., Chengdu (CN)

( * ) Notice: Subject to any disclaimer, the term of this patent is extended or adjusted under 35 U.S.C. 154(b) by 344 days.

(21) Appl. No.: 18/453,448

(22) Filed: Aug. 22, 2023

(65) Prior Publication Data

US 2024/0072468 A1 Feb. 29, 2024

(30) Foreign Application Priority Data

Aug. 24, 2022 (CN) ......................... 202211018267.4
Aug. 24, 2022 (CN) ......................... 202222250415.7

(51) Int. Cl.
*H01R 12/72* (2011.01)
*H01R 12/70* (2011.01)
*H01R 12/73* (2011.01)

(52) U.S. Cl.
CPC ....... *H01R 12/721* (2013.01); *H01R 12/7058* (2013.01); *H01R 12/737* (2013.01)

(58) Field of Classification Search
CPC . H01R 12/721; H01R 12/7058; H01R 12/737
(Continued)

(56) References Cited

U.S. PATENT DOCUMENTS 5,207,598 A * 5/1993 Yamada ............... H01R 12/721 439/157
5,211,568 A * 5/1993 Yamada ............... H01R 13/633 439/153
(Continued)

FOREIGN PATENT DOCUMENTS

CN 202633554 U 12/2012
CN 102074818 B * 6/2014
(Continued)

OTHER PUBLICATIONS

[No Author Listed], Amphenol Information Communications and Commerical Products. Amphenol ICC Storage & Server IO. 2023, 10 pages. URL:https://cdn.amphenol-cs.com/media/wysiwyg/files/documentation/customerpresentation/ddr4_product_presentation.pdf [retrieved on Dec. 19, 2023].
(Continued)

*Primary Examiner* — Abdullah A Riyami
(74) *Attorney, Agent, or Firm* — Wolf, Greenfield & Sacks, P.C.

(57) ABSTRACT

A card edge connector with reduced height that operates reliably. The connector has a housing with a slot extending toward a mounting face. An electronic card can be inserted into the slot until an edge of the card is in a seating plane. The connector has a latch pivotally connected to the housing which may be rotated to eject the card. A reinforcing member may be disposed in the latch with a foot extending between the edge of the card and the mounting face such that, when the latch is rotated, the foot may press against the edge of the card to eject the card. The reinforcing member is both mechanically stronger and thermally more conductive than the latch. Such a configuration enables the seating plane to be closer to the mounting face than that required to meet industry standards.

20 Claims, 12 Drawing Sheets

(58) Field of Classification Search
USPC .......................................................... 439/630
See application file for complete search history.

(56) References Cited

U.S. PATENT DOCUMENTS 5,470,242 A * 11/1995 Cheng ................ H01R 12/7005 439/157
5,558,528 A * 9/1996 Cheng ................ H01R 12/7005 439/155
5,672,069 A * 9/1997 Cheng ................ H01R 13/6335 439/160
5,690,499 A * 11/1997 Howell .............. H01R 12/7005 439/157
5,746,613 A * 5/1998 Cheng .................. H05K 7/1409 439/157
5,980,282 A * 11/1999 Cheng ................ H01R 12/7005 439/157
6,132,228 A * 10/2000 Lang ................ H01R 13/62988 439/160
6,390,837 B1 * 5/2002 Lee .................... H01R 12/7005 439/160
6,824,407 B1 * 11/2004 Zhao .................... H01R 12/721 439/328
7,500,863 B2 * 3/2009 Ringler .............. H01R 13/6275 439/159
7,607,949 B2 10/2009 Hsu
7,637,783 B2 12/2009 Sasaoka et al.
7,677,907 B2 3/2010 Guan et al.
7,731,541 B1 6/2010 Lee et al.
7,789,681 B2 * 9/2010 Guan ................. H01R 12/7005 439/157
7,892,006 B2 2/2011 Guan et al.
7,955,098 B1 * 6/2011 McKee ............ H01R 13/62988 439/372
7,972,171 B2 7/2011 Teh
8,025,507 B2 9/2011 Kim et al.
8,052,448 B2 * 11/2011 McKee ................ H01R 12/721 439/326
8,075,330 B1 * 12/2011 Deng ................. H01R 13/6275 439/328
8,134,875 B2 * 3/2012 Baxter ..................... G11C 5/02 365/185.11
8,142,207 B1 3/2012 Ljubijankic et al.
8,187,031 B2 5/2012 Li et al.
8,235,740 B2 * 8/2012 Tsai ................... H01R 12/7029 439/372
8,328,567 B1 * 12/2012 Yang .................. H01R 12/7005 439/157
8,403,689 B2 3/2013 Li et al.
8,517,746 B2 * 8/2013 Manickam ........... H01R 13/633 439/160
8,535,077 B2 9/2013 Shen et al.
8,616,903 B2 * 12/2013 Li ........................ H01R 12/721 439/157
8,636,528 B2 * 1/2014 Sass ................... H01R 12/7029 439/372
8,721,350 B2 5/2014 Liu et al.
8,753,138 B2 * 6/2014 Foster, Sr. ........... H01R 12/721 439/160
8,858,257 B2 * 10/2014 Mo .................. H01R 13/62977 439/578
9,166,317 B2 10/2015 Briant et al.
9,325,090 B2 * 4/2016 Shen .................... H01R 12/721
9,431,734 B2 8/2016 Guo et al.
9,685,723 B2 6/2017 Kee Mew
9,806,460 B2 * 10/2017 Li .................... H01R 13/62955
9,806,461 B2 * 10/2017 Xu ....................... H01R 12/737
9,876,314 B1 * 1/2018 Cai .................. H01R 13/62938
9,887,485 B2 2/2018 Lambie et al.
9,941,621 B2 * 4/2018 Tang .................... H01R 12/714
10,056,715 B2 * 8/2018 Cai ...................... H01R 12/721
10,103,476 B1 10/2018 Qiu et al.
10,135,165 B2 11/2018 Zuo
10,177,473 B2 * 1/2019 Bu ....................... H05K 7/1409
10,224,653 B2 3/2019 Niu et al.
10,461,467 B2 10/2019 Eppley et al.
10,651,597 B2 * 5/2020 Xie ...................... H05K 7/1409
10,741,944 B2 8/2020 Long
10,855,020 B1 12/2020 Phillips et al.
10,916,894 B2 2/2021 Kirk et al.
11,081,827 B2 * 8/2021 Eng-Kan ............ H01R 13/6273
11,374,340 B2 6/2022 Tang
11,545,769 B2 1/2023 Comerci et al.
11,637,391 B2 4/2023 Guo et al.
11,710,923 B2 7/2023 Hu et al.
11,817,639 B2 11/2023 Yi et al.
2010/0075538 A1 3/2010 Ohshida
2011/0021080 A1 1/2011 Kamiya et al.
2011/0065297 A1 3/2011 Guan et al.
2011/0136388 A1 6/2011 Fu et al.
2011/0275238 A1 11/2011 Iijima et al.
2012/0178274 A1 7/2012 Manickam
2012/0202387 A1 8/2012 McNamara
2013/0280926 A1 10/2013 Ono
2016/0020540 A1 1/2016 Shen et al.
2016/0118736 A1 4/2016 Hoyack et al.
2016/0190724 A1 6/2016 Mito
2016/0336667 A1 * 11/2016 Kee Mew .......... H01R 12/7005
2017/0302031 A1 10/2017 Cheng et al.
2018/0198220 A1 7/2018 Sasame et al.
2019/0165518 A1 5/2019 Hsu et al.
2019/0173209 A1 6/2019 Lu et al.
2019/0173232 A1 6/2019 Lu et al.
2019/0199023 A1 6/2019 Soh
2020/0076131 A1 3/2020 Hu et al.
2020/0076135 A1 3/2020 Tang et al.
2020/0203867 A1 6/2020 Lu
2021/0288423 A1 9/2021 Guo et al.
2021/0351529 A1 11/2021 Yang et al.
2021/0376508 A1 12/2021 Hu
2022/0037828 A1 2/2022 Hu et al.
2022/0069496 A1 3/2022 Yi et al.
2022/0181809 A1 6/2022 Xie et al.
2022/0181811 A1 6/2022 Liu et al.
2022/0247107 A1 8/2022 Tang et al.
2023/0096092 A1 3/2023 Hu
2023/0126150 A1 4/2023 Yang et al.
2023/0163500 A1 5/2023 Yang et al.
2023/0178916 A1 6/2023 Yang et al.
2023/0238724 A1 7/2023 Yang et al.
2023/0335931 A1 10/2023 He et al.

FOREIGN PATENT DOCUMENTS

CN 203660106 U 6/2014
CN 105703103 A 6/2016
CN 108539464 A 9/2018
CN 212874843 U 4/2021
CN 214505858 U 10/2021
EP 1213795 A2 * 6/2002 ......... H01R 12/7005
GB 227943 A 1/1925
TW 200835073 A 8/2008
TW M475740 U 4/2014
WO WO 02/073819 A2 9/2002

OTHER PUBLICATIONS

[No Author Listed], DDR5 Memory Module Sockets (SMT). Storage & Server IO. Amphenol ICC. 2022. 2 pages. URL:https://cdn.amphenol-cs.com/media/wysiwyg/files/documentation/datasheet/ssio/ssio_ddr5_smt.pdf [last accessed Mar. 22, 2022].
[No Author Listed], DDR5 SDRAM—Wikipedia. Aug. 8, 2021. 6 pages. URL:https://en.wikipedia.org/wiki/DDR5_SDRAM [last accessed on Aug. 16, 2021].
[No Author Listed], MCIO 124pos 85ohm. Amphenol Assembletech. 1 page. URL:http://www.amphenol-ast.com/v3/en/overview.aspx?classId=234 [retrieved on Apr. 11, 2022].
[No Author Listed], Mini Cool Edge IO—The Ideal Solution to Transmit Next Generation High-Speed Signal to Designated Area in Your System. Jul. 25, 2018. 2 pages. URL:https://www.amphenol-

(56) References Cited

OTHER PUBLICATIONS icc.com/connect/mini-cool-edge-io-the-ideal-solution-to-transmit-next-generation-high-speedsignal.html [retrieved on Apr. 11, 2022].
[No Author Listed], Mini Cool Edge IO Connector. Commercial IO. Amphenol ICC. 2022. 5 pages. URL:https://cdn.amphenol-icc.com/media/wysiwyg/files/documentation/datasheet/inputoutput/io_mini_cool_edge_io.pdf [retrieved on Apr. 11, 2022].
Armasu, What We Know About DDR5 So Far. Jun. 7, 2019. 20 pages. URL:https://www.tomshardware.com/news/what-we-know-ddr5-ram,39079.html [last accessed Jul. 21, 2022].
Yang et al., Reliable Card Edge Connector with Narrow Latch, U.S. Appl. No. 18/346,155, filed Jun. 30, 2023.
Yang et al., Robust Card Edge Connector, U.S. Appl. No. 18/346,150, filed Jun. 30, 2023.
Yang et al., Robust Electrical Connector, U.S. Appl. No. 18/505,468, filed Nov. 9, 2023.
Yang et al., Surface Mount Card Edge Connector And Compact Electronic System Therewith, U.S. Appl. No. 18/453,504, filed Aug. 22, 2023.

* cited by examiner

CARD EDGE CONNECTOR WITH REDUCED HEIGHT

RELATED APPLICATIONS

This application claims priority to and the benefit of Chinese Patent Application Serial No. 202222250415.7, filed on Aug. 24, 2022. This application also claims priority to and the benefit of Chinese Patent Application Serial No. 202211018267.4, filed on Aug. 24, 2022. The entire contents of these applications are incorporated herein by reference in their entirety.

FIELD

This application relates to interconnection systems, such as those including electrical connectors, configured to interconnect electronic assemblies.

BACKGROUND

Electrical connectors are used in many electronic systems. It is generally easier and more cost effective to manufacture a system as several printed circuit boards (PCB) which may be joined together with electrical connectors than to manufacture the system as a single assembly. A known arrangement for joining several PCBs may have one PCB as a backplane. Then, other PCBs, which are referred to as "daughter boards" or "daughter cards", are connected to the backplane through the electrical connector, thereby interconnecting these PCBs.

The electronic system generally has become smaller, quicker and more complex in functions. These changes mean that the number of circuits in a given area of the electronic system and the operation frequency of the circuits have been increased significantly in recent years. Therefore, miniaturization is one of the development trends of the electrical connectors.

Card edge connectors, as electrical connectors, have been widely applied in electronic products, such as computers. The card edge connectors can connect electronic cards, such as memory cards, graphics cards, sound cards and so on, to circuit boards, so that the electronic cards provide memory capacities for the electronic products and/or enhance operating rate of the electronic products and other related performances thereof.

Card edge connectors may have pivotable latches, and the latches may be pivoted to unlocked positions when the electronic cards are expected to be inserted into or pulled out from the card edge connectors. As the electronic cards are inserted into the card edge connectors, the latches may pivot to locked positions where the electronic cards are locked to the card edge connectors.

Card edge connectors of this type may be configured, for example, to receive an add-in card for a computer that contains memory chips. Such memory cards may be implemented according to a standard, such as DDR4 or DDR5. Certain aspects of the card edge connector would then also comply with the standard, such as the length and width of a slot that receives the card or the position of the head of the latch relative to the slot. According to a Joint Electron Device Engineering Council (JEDEC) standard for example, it is desirable for a card edge connector to hold a card with a separation between the edge of the card inserted into the connector and a surface of a PCB to which the connector is mounted with a separation that is no greater than 2.00 mm. The standard, however, does not define how such a connector may be implemented.

BRIEF SUMMARY

Aspects of the present application relate to card edge connectors with reduced height.

Some embodiments relate to a card edge connector. The card edge connector may include a housing comprising a mating face, a mounting face opposite the mating face in a vertical direction, a slot extending from the mating face toward the mounting face, and an engaging surface disposed in the slot and configured for engaging an edge of an electronic card inserted in the slot, wherein a vertical distance from the engaging surface to the mounting face may be in a range of 0 to 0.95 mm.

Optionally, the engaging surface may be parallel to the mounting face.

Optionally, the card edge connector may include a latch pivotally connected to the housing between a locked position and an unlocked position, the latch comprising a latch head and a latch tail opposite the latch head in the vertical direction; and a reinforcing member at least partially disposed in the latch, the reinforcing member comprising a foot extending beyond the latch tail and having a mechanical strength greater than that of the latch.

Optionally, the foot of the reinforcing member may have a surface facing the mating face and configured to engage the edge of the electronic card inserted in the slot; and when the latch is in the locked position, the surface of the foot of the reinforcing member may be disposed between the mating face and the engaging surface in the vertical direction.

Optionally, a distance from the surface of the foot of the reinforcing member to the mounting face may be less than or equal to a JEDEC predetermined value.

Optionally, a vertical dimension of the foot of the reinforcing member may be in a range of 0 to 1.0 mm.

Optionally, the reinforcing member may be made of metal.

Optionally, the card edge connector may include a plurality of conductive elements held by the housing, each of the plurality of conductive elements comprising a mating end curving into the slot, a mounting end extending beyond the mounting face, and an intermediate portion joining the mating end and the mounting end.

Optionally, the latch may comprise a latch body joining the latch head and the latch tail, the latch body may comprise: a first latch body portion connected to the latch head, a second latch body portion connected to the latch tail, and a third latch body portion joining the first latch body portion and the second latch body portion; latch extensions may extend from the second latch body portion and the third latch body portion toward the slot; and the latch extensions may be configured to engage an inner cavity of the housing when the latch is in the locked position.

Some embodiments relate to a latch assembly for a card edge connector. The latch assembly may include a latch, the latch comprising a latch head, a latch tail opposite the latch head, and a latch body joining the latch head and the latch tail; and a reinforcing member at least partially disposed in the latch, the reinforcing member comprising a foot extending beyond the latch tail, wherein: the reinforcing member may have a mechanical strength greater than that of the latch; and the reinforcing member may have a thermal conductivity greater than that of the latch.

Optionally, the reinforcing member may comprise a support portion having a first end and a second end opposite the first end, a first curved portion extending from the first end of the support portion, and a second curved portion extending from the second end of the support portion; the first curved portion may be at least partially disposed in the latch head; and the foot may extend from the second curved portion and away from the support portion.

Optionally, the support portion of the reinforcing member may comprise a first through-hole; and the latch may comprise a second through-hole aligned with the first through-hole such that the first through-hole and the second through-hole may be aligned with a slot of the card edge connector when the latch is in a locked position.

Optionally, the first curved portion of the reinforcing member may comprise a third through-hole.

Optionally, the latch may comprise a pair of hubs; the reinforcing member may comprise a pair of hubs disposed on the support portion and a rib connecting the pair of hubs; and the pair of hubs of the reinforcing member may be at least partially disposed in respective ones of the pair of hubs of the latch.

Optionally, the support portion of the reinforcing member may comprise a projection extending through a side wall of the latch body.

Some embodiments relate to a card edge connector. The card edge connector may include a housing having a mating face, a mounting face opposite the mating face in a vertical direction, and a slot extending from the mating face toward the mounting face, the slot elongated in a longitudinal direction perpendicular to the vertical direction; a latch pivotally connected to the housing between a locked position and an unlocked position; and a reinforcing member at least partially disposed in the latch and comprising a foot extending beyond an end of the latch toward the slot.

Optionally, a vertical dimension of the foot of the reinforcing member may be in a range of 0 to 0.95 mm such that a vertical dimension from a seating plane in the slot to the mounting face may be in a range of 0 to 0.95 mm.

Optionally, the housing may comprise a tower elongated in the vertical direction; and when the latch is in the locked position, the reinforcing member may extend above the tower of the housing.

Optionally, the housing may comprise a hole; the latch may comprise a hub disposed in the hole of the housing such that the latch may be pivotably connected to the housing; and the reinforcing member may comprise a hub at least partially disposed in the hub of the latch.

Optionally, the card edge connector may include a plurality of conductive elements held by the housing, each of the plurality of conductive elements comprising a mating end curving into the slot, a mounting end extending beyond the mounting face, and an intermediate portion joining the mating end and the mounting end.

Some embodiments relate to a card edge connector. The card edge connector may comprise an insulating housing having a mating face and a mounting face opposite each other along a vertical direction. The mating face may be provided with a slot. The slot may be configured for receiving an edge of an electronic card such that the edge is disposed on an engaging surface within the slot. The vertical distance from the engaging surface to the mounting face may be not greater than 0.95 mm.

Optionally, the engaging surface is parallel to the mounting face.

Optionally, the card edge connector may further comprise a latch pivotally connected to the insulating housing between a locked position and an unlocked position. A latch reinforcing member may be mounted to the latch. The latch reinforcing member may include a reinforcing foot extending beyond a latch tail of the latch. The mechanical strength of the reinforcing foot may be greater than that of the latch, and the reinforcing foot may be tilted toward the mating face when the latch is in the unlocked position to lift the electronic card in the slot up.

Optionally, the reinforcing foot may have a limit surface facing the mating face. The limit surface may be closer to the mating face than the engaging surface when the latch is in the locked position and is configured to support the edge of the electronic card.

Optionally, the distance from the limit surface to the mounting face may be less than or equal to a JEDEC predetermined value.

Optionally, the vertical dimension of the reinforcing foot may be less than or equal to 1.0 mm.

Optionally, the latch reinforcing member further may comprise a support portion, a first curved portion and a second curved portion. The support portion may have a first end adjacent to the mating face and a second end adjacent to the mounting face. The first curved portion and the second curved portion may bend from the first end and the second end toward the slot, respectively. The reinforcing foot may be connected to an end of the second curved portion away from the support portion. The first curved portion may be at least partially disposed in a latch head of the latch for locking the electronic card.

Optionally, the support portion may be provided with a first through-hole. The latch may be provided with a second through-hole aligned with the first through-hole. The first through-hole and the second through-hole may be aligned with the slot when the latch is in the locked position.

Optionally, the first through-hole and the second through-hole may be concentric, and the second through-hole may be larger than the first through-hole.

Optionally, an end of the first curved portion away from the support portion may be disposed above a tower of the insulating housing when the latch is in the locked position.

Optionally, the first curved portion may be provided with a third through-hole.

Optionally, the latch may be provided with a hub, and the insulating housing may be provided with a hole. The hub may be connected into the hole such that the latch is pivotably connected to the insulating housing. The latch reinforcing member may further include a hub provided on the support portion, and the hub may be at least partially disposed in the hub.

Optionally, the latch reinforcing member may further include a rib protruding from the support portion toward the slot. The rib may be perpendicular to the vertical direction. The hub may be disposed at an end of the rib.

Optionally, the latch reinforcing member may be made by powder metallurgy.

Optionally, the latch reinforcing member may be made by stamping.

Optionally, the latch further may comprise a latch body connected between the latch head and the latch tail. The latch body may include: a first latch body portion connected to the latch head; a second latch body portion connected to the latch tail; and a third latch body portion connected between the first latch body portion and the second latch body portion. A extension may extend from the first latch body portion and the second latch body portion toward the slot. A tower of the insulating housing may be provided with an inner cavity, and the extension may be engaged with the inner cavity when the latch is in the locked position.

Optionally, the first latch body portion may abut against the tower along an extension direction of the slot when the latch is in the locked position. The dimension of the first latch body portion along the extension direction of the slot may be less than or equal to 2.5 mm.

Optionally, the card edge connector may further comprise a tower reinforcing member disposed within the tower and between the inner cavity and the mating face. The tower reinforcing member may be of U shape, and the slot may extend into an opening of the U shape.

Optionally, the inner cavity may be in communication with the slot. The extension may include a first extension and a second extension spaced apart and disposed on both sides of the slot, respectively.

Optionally, the U shape may have a bottom portion opposite the opening. The bottom portion may face the latch and be exposed outside the tower. An outer side surface of the inner cavity facing the latch may be provided with a step. The bottom portion of the U shape may sit on the step. The step may be between ends of the first extension and the second first extension facing the mating face.

Optionally, the tower may be further provided with an outer cavity that is disposed on a side of the inner cavity away from the slot. The inner side wall of the outer cavity may be provided with a locking portion. The outer side wall of the third latch body portion may be provided with a protrusion. The locking portion and the protrusion may be locked with each other when the latch is in the locked position.

Optionally, the second latch body portion may be pivotably connected to the tower.

Optionally, the support portion may include: a first support subportion at least partially disposed in the first latch body portion and connected to the first curved portion; a second support subportion at least partially disposed in the second latch body portion and connected to the second curved portion; and a third support subportion at least partially disposed in the third latch body portion and connected between the first curved portion and the second curved portion. The first support subportion and the third support subportion may have widths greater than the second support subportion, and the second support subportion may have the same width as the reinforcing foot.

Optionally, a part of the third support subportion connected to the second support subportion may have a reduced dimension along a direction toward the second support subportion.

Optionally, the support portion may extend along the vertical direction.

Optionally, the latch reinforcing member may be made of metal.

Optionally, the latch may be fixed onto the latch reinforcing member by overmolding.

Optionally, the card edge connector may further comprise a plurality of conductive members. Each of the plurality of conductive members may include an mating end bent into the slot, a mounting end extending beyond the mounting face, and an intermediate portion connected between the mating end and the mounting end.

According to another aspect of the present disclosure, a card edge connector is provided. The card edge connector may comprise an insulating housing having an mating face and a mounting face opposite each other along a vertical direction. The mating face may be provided with a slot. The slot may be configured for receiving an edge of an electronic card such that the edge is disposed on an engaging surface within the slot. The card edge connector may further comprise a latch pivotally connected to the insulating housing between a locked position and an unlocked position. The latch may have a reinforcing foot extending beyond a latch tail of the latch. The mechanical strength of the reinforcing foot may be greater than that of the latch. The reinforcing foot may be tilted toward the mating face when the latch is in the unlocked position to lift the electronic card in the slot up.

Optionally, the vertical dimension of the reinforcing foot may not exceed 1.0 mm such that the vertical dimension from the engaging surface to the mounting face is not greater than 0.95 mm.

Optionally, the reinforcing foot may have a limit surface facing the mating face, and the limit surface may be configured to support the edge of the electronic card when the latch is in the locked position.

Optionally, the reinforcing foot may be a part of a latch reinforcing member, and the latch reinforcing member may extend from a latch head of the latch for locking the electronic card to the latch tail.

Optionally, the latch reinforcing member may extend to the above of a tower of the insulating housing when the latch is in the locked position.

Optionally, the latch may be provided with a hub, and the insulating housing may be provided with a hole. The hub may be connected into the hole such that the latch is pivotably connected to the insulating housing. The latch reinforcing member may further include a hub at least partially disposed in the hub.

Optionally, the card edge connector may further comprise a plurality of conductive elements. Each of the plurality of conductive elements may include an mating end bent into the slot, a mounting end extending beyond the mounting face, and an intermediate portion connected between the mating end and the mounting end.

These techniques may be used alone or in any suitable combination. The foregoing summary is provided by way of illustration and is not intended to be limiting.

BRIEF DESCRIPTION OF DRAWINGS

The accompanying drawings may not be drawn to scale. In the drawings, each identical or nearly identical component that is illustrated in various figures may be represented by a like numeral. For purposes of clarity, not every component may be labeled in every drawing. In the drawings.

Figure 1:
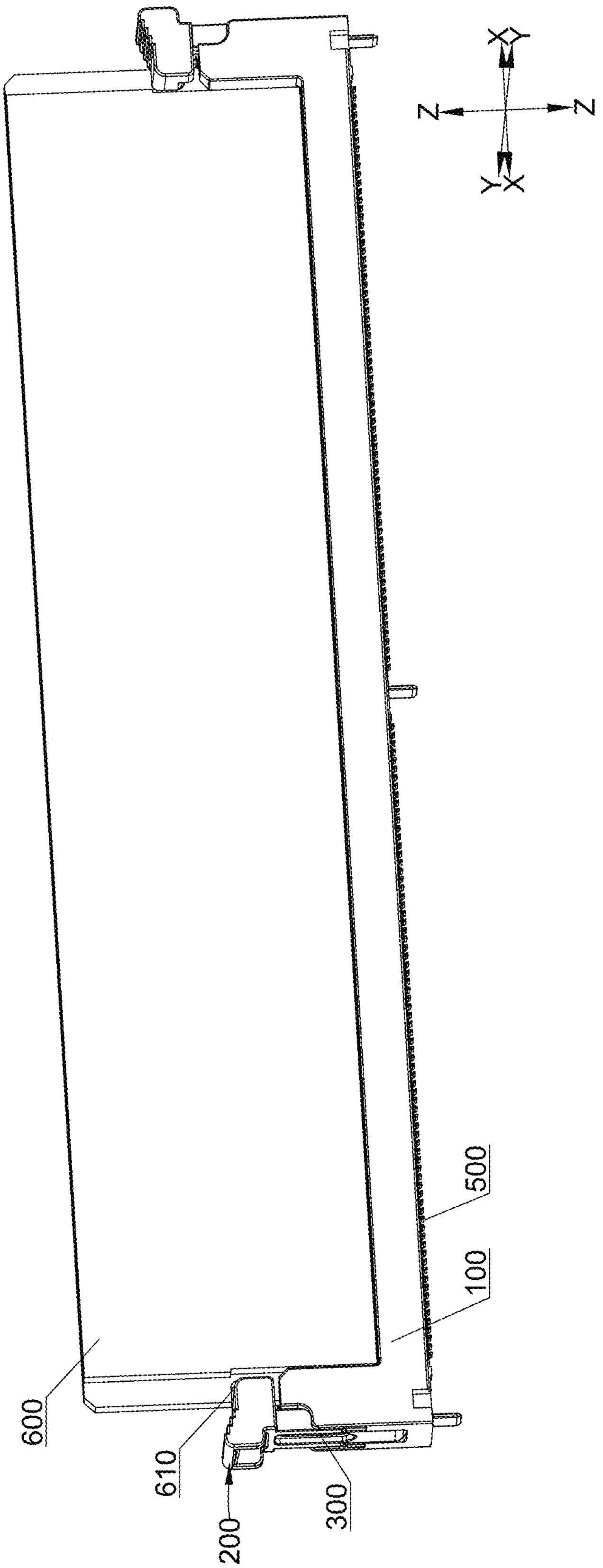
FIG. 1 is a perspective view of a card edge connector according to an exemplary embodiment of the present disclosure connected with an electronic card, wherein a latch is in a locked position.

The above accompanying drawings include the following reference signs:

100, insulating housing; 101, mating face; 102, mounting face; 110, body; 120, tower; 121, filling part; 130, slot; 131, engaging surface; 150, hole; 160, inner cavity; 161, step; 170, outer cavity; 171, locking portion; 180, groove; 181, first bulge; 182, second bulge; 183, first recess; 184, second recess; 200, latch; 210, latch head; 211, transverse rib; 220, latch tail; 230, latch body; 231, first latch body portion; 232, second latch body portion; 233, third latch body portion; 241, second through-hole; 242, hub; 243, protrusion; 250, extension; 251, first extension; 252, second extension; 300, 300', latch reinforcing member; 310, reinforcing foot; 311, limit surface; 320, support portion; 321, first end; 322, second end; 323, first support subportion; 324, second support subportion; 325, third support subportion; 330, first curved portion; 340, second curved portion; 351, first through-hole; 352, third through-hole; 353, hub; 354, rib; 360, projection; 361, distal end; 400, tower reinforcing member; 410, opening; 420, bottom portion; 430, transverse portion; 441, first longitudinal portion; 442, second longitudinal portion; 451, first positioning projection; 452, second positioning projection; 461, first arc transition portion; 462, second arc transition portion; 500, conductive element; 510, mating end; 520, mounting end; 530, intermediate portion; 600, electronic card; 610, notch; 640, edge; 641, middle surface; 642, end surface.

DETAILED DESCRIPTION

The inventors have recognized and appreciated connector designs that reduce the overall height within an electronic system for a connector and add in card mated to the connector, while maintaining and/or enhancing the mechanical strength of the connector, contributing to reliable performance of systems using those electrical connectors. Card edge connectors, such as DDR5 (Double-Data-Rate at generation 5) connectors, may be used for interconnection between electronic boards (e.g., graphics cards, memory cards, etc.). DIMMs (Dual Inline Memory Modules) may be used in a computer and connected to a mainboard of the computer via card edge connectors, for example. Card edge connectors may be fixed onto the mainboard, and conductive members in the card edge connectors are connected to circuits on the mainboard. DIMMs can be inserted into the card edge connectors so that conductive pads, sometimes called "golden fingers," of DIMMs are electrically connected with the conductive members in the card edge connectors, thereby interconnecting the golden fingers of DIMMs with the circuits of the mainboard.

An electronic card can be inserted into a slot of an insulating housing of the connector. The electronic card, when fully inserted into the slot, will have its forward edge in a location that is separated from the PCB or other substrate to which the connector is mounted. This location of the forward edge may be referred to as the seating plane of the card. The seating plane of the card may be established by one or more engaging surfaces of the connector that block further insertion of the card into the slot of the connector. In operation, the card may be inserted into the slot from a mating face of a card edge connector until an edge of the electronic card abuts an engaging surface inside the slot. Under the specifications of Joint Electron Device Engineering Council (JEDEC), it is desired to have a card edge connector that may have a seating plane spaced from its mounting face by a distance not greater than 2 mm.

The inventors have recognized and appreciated that having card edge connectors with seating plane separated from the substrate by a distance less than that required by the JEDEC standard can contribute to the miniaturization of the electronic systems that uses these connectors. However, reducing the height of the engaging surfaces of the connector conventionally requires reducing the thickness of structures of the connector, such as the floor of the connector mounted against the substrate or a tail of a latch that pushes a card from a locked to an unlocked position, which would cause various problems as a result of reduced mechanical strength of these components. Such a result is counterproductive as the challenges of developing connector with sufficient mechanical strength to operate with electronic cardis increasing as a result of the continued increase of functionalities of those electronic cards. Added weight of the cards, for example, may increase the requirement of the mechanical strength of one or more portions of the connector. Memory modules, for example, have become larger and/or heavier and may require a tail of a latch that pushes the card out of a seated position to endure greater forces when the card is to be removed from the connector.

To retain an electronic card, a card edge connector may include a latch which is pivotably connected to an insulating housing of the card edge connector. By pivoting the latch to a locked position, the electronic card is securely locked in the slot of the card edge connector. Notches may be provided on opposite sides of the electronic card. When the latch is pivoted to the locked position, a transverse rib on a latch head of the latch may be disposed in the notch and engage the edge of the notch, such that the electronic card is locked to the card edge connector. When the latch is pivoted to an unlocked position, the transverse rib of the latch head is pivoted outwardly to exit the notch of the electronic card and a latch tail of the latch is pivoted upwardly into the slot, thereby lifting up the electronic card from the slot and enabling the electronic card to be removed.

Reducing the height of the card edge connector would lead to the reduction of the height available for the latch tail, which fits between the edge of the card and the substrate to which the connector is mounted. Using conventional techniques, reduced height reduces the mechanical strength of the latch tail. The latch tail, used for lifting up the electronic card when the latch is being pivoted to the unlocked position, may bend or be damaged due to the reduced mechanical strength. As a result, the electronic card cannot be lifted up successfully, and the electronic card may be not easily removed. Also, the latch is usually made of an insulating material, such as plastic, which causes it to be somewhat flexible because of its reduced vertical dimension. In the process of the latch tail lifting up the electronic card, the stability for successfully lifting up the electronic card may be lowered.

In some embodiments of the present disclosure, a connector may have a housing with a mating face, a mounting face, a slot extending from the mating face toward the mounting face, and an engaging surface in the slot. An electronic card can be inserted, from the mating face, into the slot until an edge of the card engages the engaging surface. The connector may further have a latch assembly, which may include a latch pivotally connected to the housing and a reinforcing member at least partially disposed in the latch and having a foot extending beyond a latch tail. The reinforcing member may be both mechanically stronger and thermally more conductive than the latch. The foot may support the electronic card when the latch is in a locked position and eject the electronic card when the latch is in an unlocked position. Such a configuration enables the engaging surface to be closer to the mounting face than that specified in industry standard and therefore a connector with reduced height that operates reliably.

The following is a detailed description to some embodiments of the card edge connector in conjunction with the accompanying drawings.

A vertical direction Z-Z, a longitudinal direction X-X and a transverse direction Y-Y described herein may be perpendicular to each other. The vertical direction Z-Z may refer to a height direction of the card edge connector. The longitudinal direction X-X may refer to a length direction of the card edge connector. The transverse direction Y-Y may refer to a width direction of the card edge connector.

As shown in FIGS. 1-2, 3A-3B and 4, the card edge connector may comprise an insulating housing 100 and a latch 200. The insulating housing 100 may be molded with an insulative material, such as a plastic. The insulating housing 100 may be a one-piece member. The insulating housing 100 may have a mating face 101 and a mounting face 102. The mating face 101 and the mounting face 102 may be disposed opposite each other along the vertical direction Z-Z.

A plurality of conductive elements 500 may be held in the insulating housing 100. Adjacent conductive elements 500 may be spaced apart from each other to ensure that the adjacent conductive elements 500 are electrically insulated from each other. The conductive elements 500 may be made of an electrically conductive material, such as metal. The conductive elements 500 may be elongated one-piece members. Each conductive element 500, along its extending direction, may comprise a mating end 510 and a mounting end 520 at opposite ends of the conductive element 300, and an intermediate portion joining the mating end 510 and the mounting end 520. The mating end 510 can be configured to electrically connect with circuits on an electronic card 600. The electronic card 600 may include, but is not be limited to, a memory card or a graphics card. The mounting end 520 may be connected to pads on the mainboard by, for example, soldering. In this way, the electronic card 600 can be electrically connected to the mainboard by the card edge connector, thereby interconnecting the circuits on the electronic card 600 with the circuits of the mainboard.

Figure 3A:
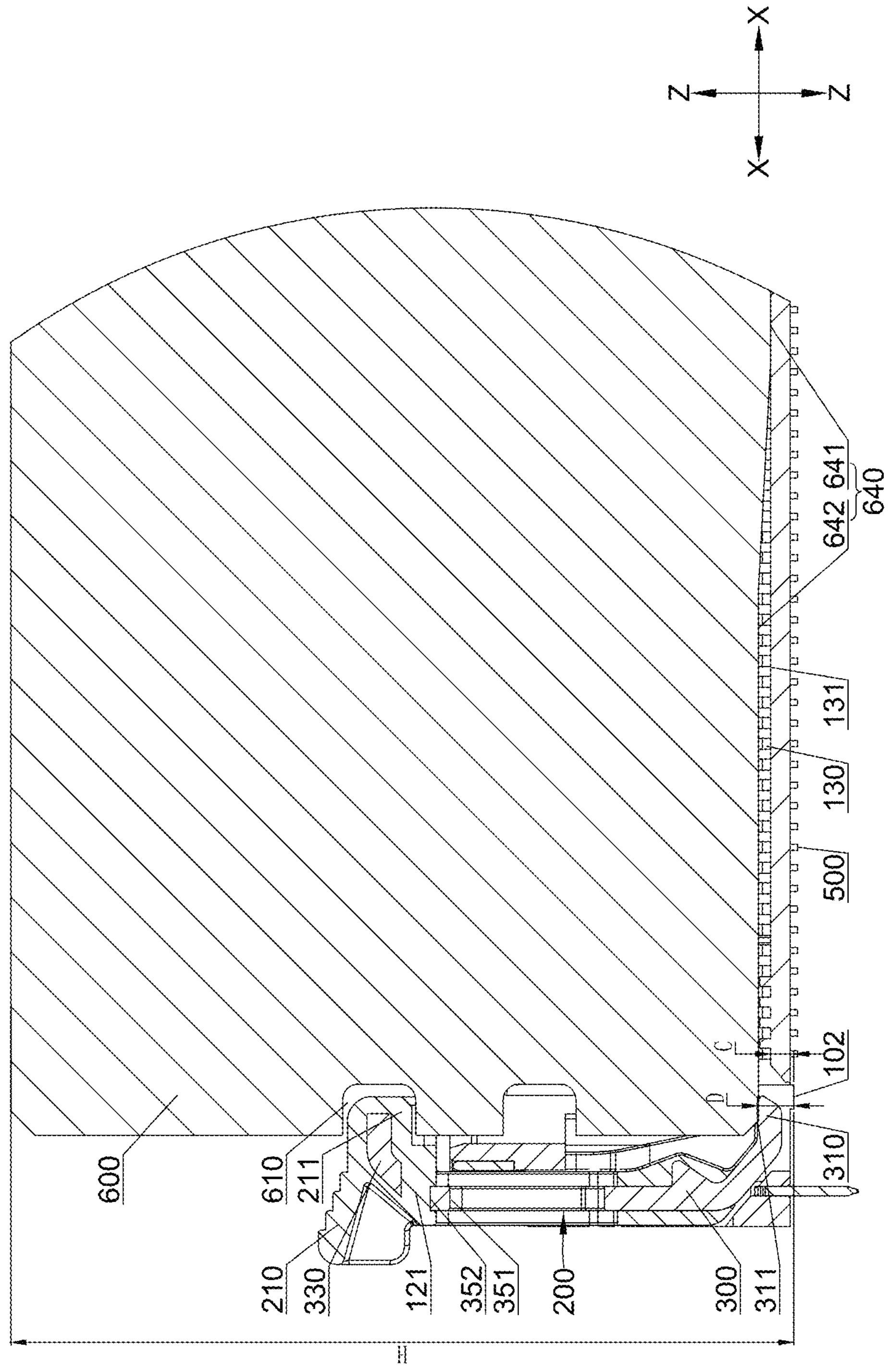
FIG. 3A is a partial cross-sectional view of the card edge connector connected with the electronic card as shown in FIG. 1 taken by a plane perpendicular to a transverse direction.
Figure 3B:
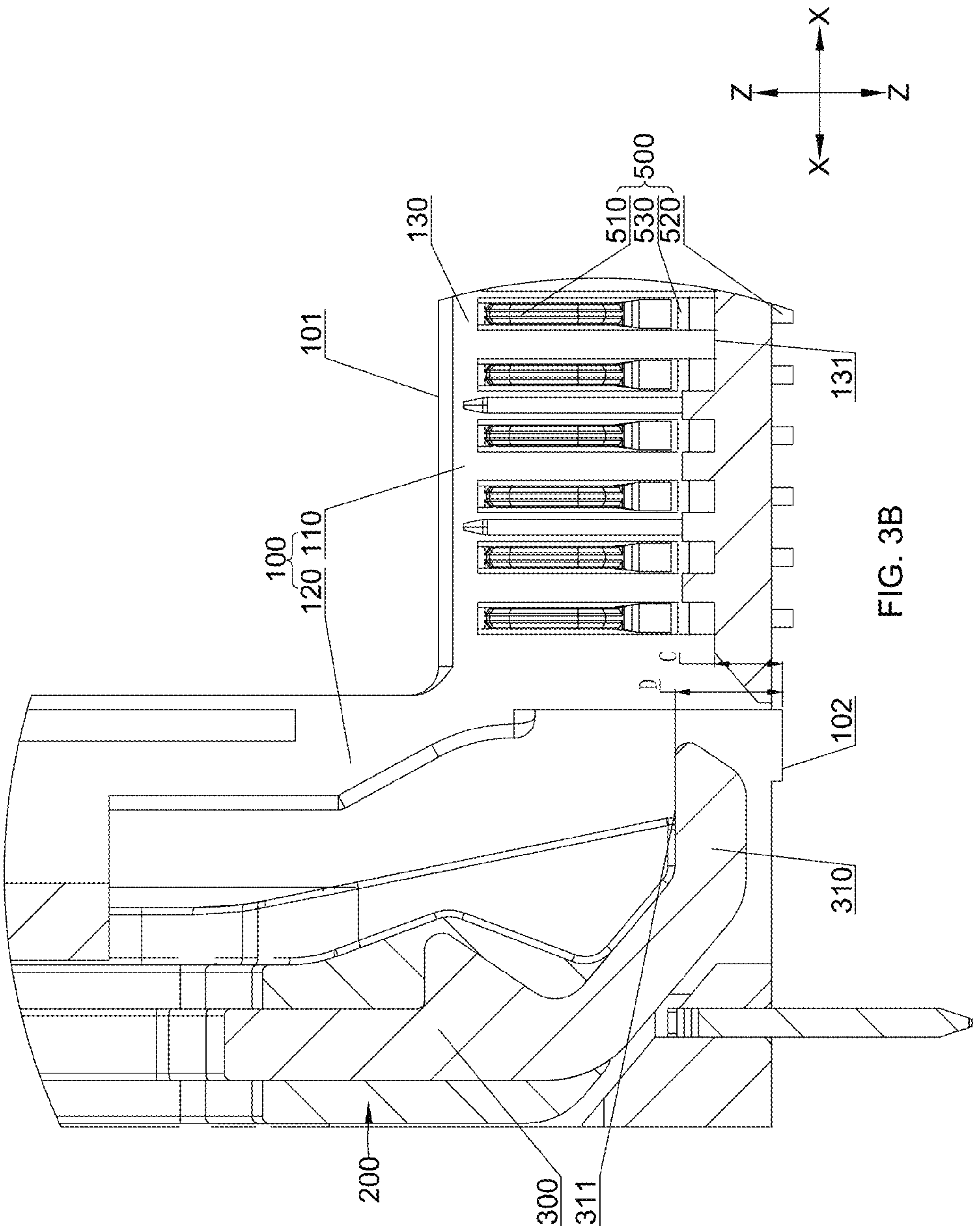
FIG. 3B is a partial cross-sectional view of the card edge connector as shown in FIG. 1 taken by a plane perpendicular to a transverse direction.

The mating face 101 may be provided with a slot 130. The slot 130 may extend from the mating face 101 toward the mounting face 102. The slot 130 may be configured to receive an edge 640 of the electronic card 600. The edge 640 of the electronic card 600 may be inserted into the slot 130. Upon full insertion, the edge 640 may be in the seating plane of the connector. In the example provided, full insertion is defined by edge 640 abutting engaging surface 131 therein, as shown in FIGS. 3A-3B. In this example, the seating plane is coincident with engaging surface 131. The edge 640 of the electronic card 600 may be positioned on the engaging surface 131 in the slot 130. That is, after the electronic card 600 is inserted into the slot 130 in place, the edge 640 may be disposed on the engaging surface 131. Exemplarily, the engaging surface 131 may be on a bottom wall of the slot 130. After the electronic card 600 is inserted into the slot 130 in place, the edge 640 may abut against the bottom wall of the slot 130. The engaging surface 131 may be slightly above the bottom wall of the slot 130, or may be shaped as an arc intersecting the bottom wall, and so on.

The mating end 510 of each conductive element 500 may extend to the mating face 101. The mating end 510 may curve into the slot 130 adjacent the mating face 101. The mounting end 520 of the conductive element 500 may extend beyond the mounting face 102.

The conductive elements 500 may be arranged in two rows on two sides of the slot 130 with each row extending along the longitudinal direction X-X. Optionally, the two rows of conductive elements 500 may be aligned with each other along the longitudinal direction X-X. Optionally, the two rows of conductive elements 500 may be staggered along the longitudinal direction X-X to increase the space between the conductive elements 500 so as to reduce crosstalk.

Referring to FIGS. 3A-3B, a vertical distance C from the engaging surface 131 to the mounting face 102 may be not greater than 0.95 mm (i.e. less than or equal to 0.95 mm). The vertical distance C may, for example, be 0.95 mm, 0.94 mm, 0.93 mm or less. Under the specifications of JEDEC, the vertical distance C is about 2 mm. In comparison, the vertical distance C of the card edge connector provided by the embodiments of the present disclosure can be substantially reduced, thereby allowing a significant reduction in the vertical dimension of the card edge connector. In this way, the electronic system using the card edge connector provided by the embodiments of the present disclosure can achieve the target of miniaturization.

In one embodiment, as shown in FIG. 3A, a total vertical distance H (i.e., a vertical distance from the mounting face 102 to the top of the electronic card 600) can be reduced by about 1.0 mm, or even more than 1.0 mm, when this card edge connector is connected with the electronic card 600.

Exemplarily, as shown in FIGS. 3A-3B, the engaging surface 131 may be parallel to the mounting face 102. With this configuration, the insulating housing 100 has a comparatively simple structure and is inexpensive to manufacture.

Figure 4:
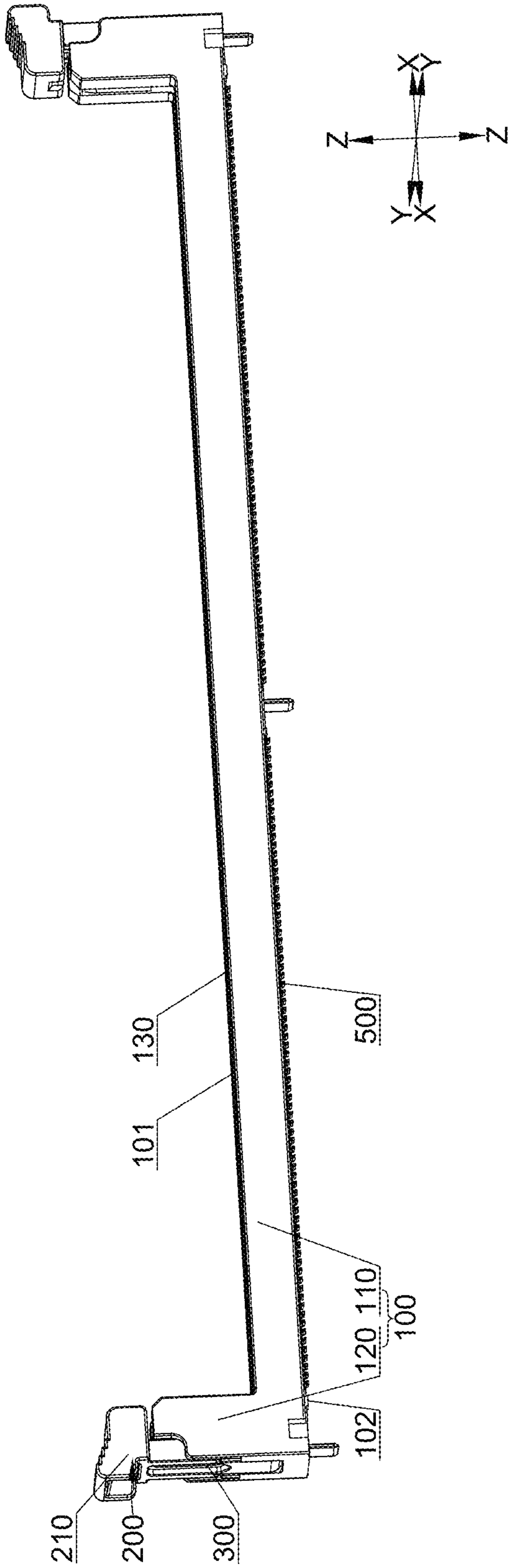
FIG. 4 is a perspective view of a card edge connector according to an exemplary embodiment of the present disclosure.

As shown in FIG. 4, the insulating housing 100 may comprise a body 110 and a tower 120. The body 110 may extend along the longitudinal direction X-X. The tower 120 may be connected to the end of the body 110 in the longitudinal direction X-X. The tower 120 may protrude out from the end of the body 110 along the vertical direction Z-Z. Both the mating face 101 and the mounting face 102 may extend from the body 110 to the tower 120. The slot 130 may also extend from the body 110 to the tower 120.

Exemplarily, only one end of the body 110 in the longitudinal direction X-X may be provided with the tower 120. More preferably, both ends of the body 110 in the longitudinal direction X-X may be provided with the towers 120. The towers 120 may be disposed on opposite ends of the body 110 in the longitudinal direction X-X, respectively. The towers 120 may act as longitudinal ends of the insulating housing 100. A latch 200 may be pivotally connected to the insulating housing 100 between a locked position and an unlocked position. The latch 200 may be pivotally connected to the tower 120 between the locked position and the unlocked position. When the latch 200 is in the locked position, it is locked to the tower 120.

Figure 2:
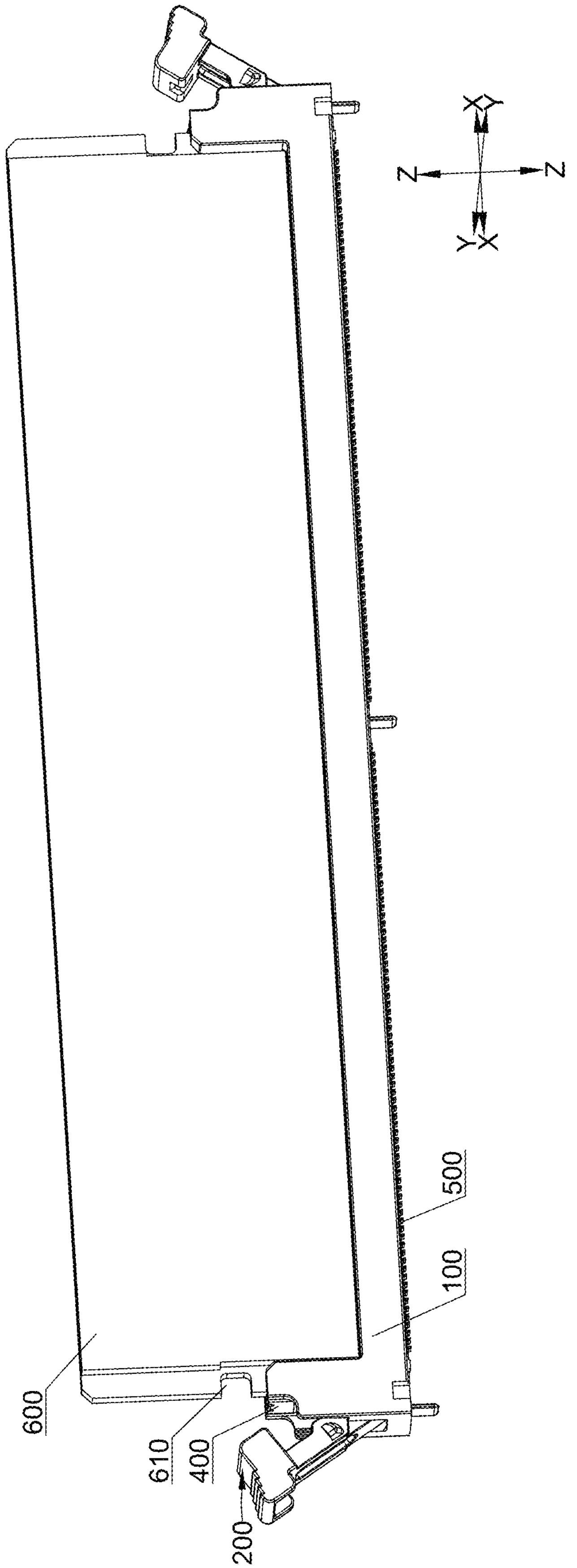
FIG. 2 is a perspective view of the card edge connector connected with the electronic card as shown in FIG. 1, wherein the latch is in an unlocked position.

The latch 200 may be configured to retain and release the electronic card 600 inserted into the slot 130, as shown in FIGS. 5-6 and FIGS. 9-10. The latch 200 may have a latch head 210 and a latch tail 220 disposed opposite each other along the vertical direction Z-Z. When the latch 200 is in the locked position in FIG. 1, a transverse rib 211 of the latch head 210 (as shown in FIG. 3A) may extend into the notch 610 of the electronic card 600 and block the edge of the notch 610 such that the latch 200 can lock the electronic card 600 onto the insulating housing 100. The latch head 210 may have one or more kinds of non-slip stripes, grooves and steps. The latch head 210 helps the user to pivot the latch 200 between the locked position and the unlocked position, in particular to the unlocked position. In FIG. 2, the latch 200 is in the unlocked position, the latch 200 is pivoted outward and the transverse rib 211 exits the notch 610.

A latch reinforcing member 300 may be mounted to the latch 200. The latch reinforcing member 300 may include a reinforcing foot 310 extending beyond the latch tail 220. The mechanical strength of the reinforcing foot 310 may be greater than that of the latch 200. Thus, the reinforcing foot 310 has a better bending resistance relative to the latch 200. The reinforcing foot 310 may be made of a high strength material such as, metal. The reinforcing foot 310 may be made of any suitable metal, such as iron, titanium, tungsten, steel, nichrome, titanium alloy, tungsten alloy, copper alloy or stainless steel. The reinforcing foot 310 may be a part of the latch reinforcing member 300. The parts of the latch reinforcing member 300 other than the reinforcing foot 310 may be configured to secure the latch reinforcing member 300 to the latch 200. Optionally, the parts other than the reinforcing foot 310 may have a lower mechanical strength than that of the reinforcing foot 310. Optionally, a surface layer may be provided on the surface of the reinforcing foot 310. The surface layer may be formed by coating, sputtering, plating, or bonding and so on, or by the means of surface modification using, for example, ion injection into the reinforcing foot 310. The surface layer may be configured to improve the mechanical strength of the reinforcing foot 310, to improve the abrasion resistance of the reinforcing foot 310 and/or to provide insulating property to the surface of the reinforcing foot 310, and so on. The latch reinforcing member 300 may be a one-piece member. The latch reinforcing member 300 may be made, for example, by stamping or casting.

When the latch 200 is being pivoted to the unlocked position, the reinforcing foot 310 may be tilted toward the mating face 101 so that it may abut against the edge 640 of the electronic card 600 in the slot 130 to lift up the electronic card 600. The electronic card 600 can be removed from the insulating housing 100 easily.

The latch head 210 and the latch tail 220 may be disposed at opposite ends of the latch 200 opposed to each other along the vertical direction Z-Z. The latch 200 may be molded from an insulating material, such as a plastic by molding process. The latch 200 may be a one-piece member. The latch 200 and insulating housing 100 may be made of the same or different materials. The latch reinforcing member 300 may be connected to the latch 200 by any suitable means. Optionally, the reinforcing member 300 may be assembled into the latch 200. Optionally, the latch 200 may be formed by overmolding the latch reinforcing member 300.

Figure 10:
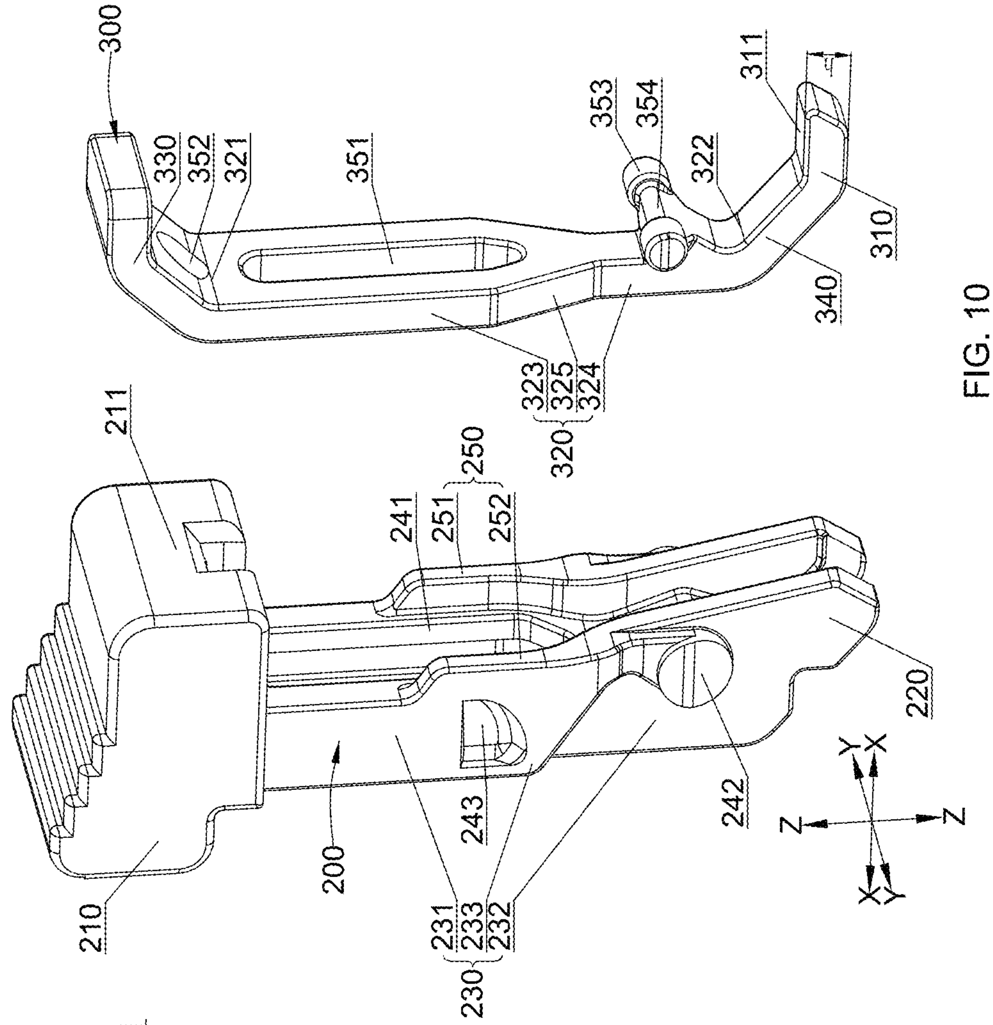
FIG. 10 is an exploded view of the latch and latch reinforcing member of the card edge connector as shown in FIG. 9.
Figure 9:
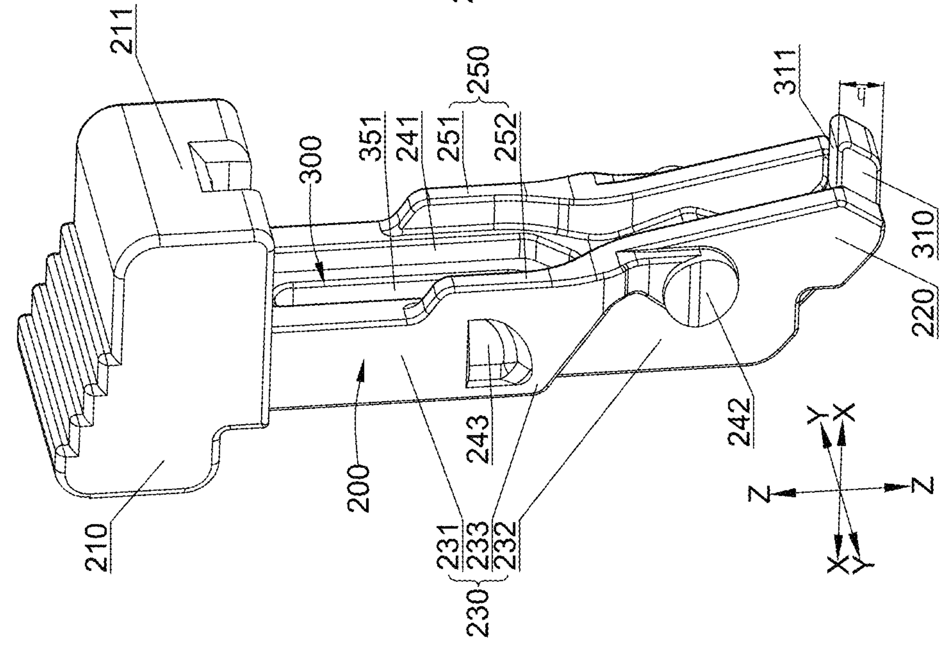
FIG. 9 is a perspective view of a latch and a latch reinforcing member of a card edge connector according to an exemplary embodiment of the present disclosure.

In the card edge connector provided by the embodiments of the present disclosure, the reinforcing foot 310 may be configured to lift up the electronic card 600 during the unlocking process. Due to the greater mechanical strength of the reinforcing foot 310, the reinforcing foot 310 may not bend, or even be damaged, when the electronic card 600 is held in the slot 130 of the insulating housing 100 with a greater holding force. Moreover, the vertical dimension h of the reinforcing foot 310 (as shown in FIGS. 9-10) may also be appropriately reduced, while it is capable to provide sufficient supporting force to ensure that the electronic card 600 can be stably lifted up. Such a configuration enables reducing the vertical dimension of the card edge connector while ensuring that the card edge connector can lift up the electronic card 600 smoothly.

Exemplarily, the vertical dimension h of the reinforcing foot 310 may be less than a predetermined dimension, as shown in FIGS. 9-10. The vertical dimension h may also be referred to as the thickness of the reinforcing foot 310. In this case, the predetermined dimension may also be referred to as a predetermined thickness. The said predetermined dimension may be determined by those skilled in the art based on current practical needs. The increase of the mechanical strength of the material for the reinforcing foot 310 enables the reduction of the vertical dimension h of the reinforcing foot. In some embodiments, the vertical dimension h of the reinforcing foot 310 may be less than or equal to 1.0 mm. Exemplarily, the vertical dimension h of the reinforcing foot 310 may be 1.0 mm, 0.9 mm, 0.8 mm, or less. The reinforcing foot 310 with a reduced vertical dimension h enables the reduction of the vertical dimension of the card edge connector.

As shown in FIGS. 3A-3B and FIGS. 9-10, the space occupied by the reinforcing foot 310 in the card edge connector is reduced based on the reduction of the vertical dimension h of the reinforcing foot 310. In this way, the edge 640 of the electronic card 600 can be lowered. The edge 640 may be of any suitable shape such as a flat or a curved surface. In one embodiment, as shown in FIG. 3A, the edge 640 may include a middle surface 641 and an end surface 642. The middle surface 641 may be disposed in the middle of the slot 130. The end surface 642 may be disposed at the end of the slot 130. The middle surface 641 is closer to the mounting face 102 than the end surface 642. In this way, the edge 640 may be in an arc, with an opening of the arc toward the mating face 101. The edge 640 is higher at the ends and lower in the middle, primarily to give place to the reinforcing foot 310 at the end. In this way, the overall height of the card edge connector and the electronic card 600 inserted into it is further reduced. Since the edge 640 is higher at the ends only, it may ensure that most of the gold fingers on the electronic card 600 have a sufficient wipe distance and the electronic card 600 can be inserted into the bottommost part of the slot 130 at most positions so that the conductive elements 500 on both sides of the slot 130 can clamp the electronic card 600 and reduce the shaking of the electronic card 600 along the transverse direction Y-Y.

When the latch 200 is in the locked position, the reinforcing foot 310 can be located between the end surface 642 and the mounting face 102 along the vertical direction Z-Z. With this configuration, the vertical distance between the end surface 642 and the mounting face 102 is relatively larger so that there is sufficient space to accommodate the reinforcing foot 310. In the embodiment where the engaging surface 131 is the bottom wall of the slot 130, the middle surface 641 may abut against the bottom wall of the slot 130 after the electronic card 600 is inserted in place into the slot 130. The end surface 642 may be slightly higher than the bottom wall of the slot 130. The bottom wall may be configured to support the electronic card 600 in order to make the electronic card 600 more stable in use.

Regardless of the shape of the edge 640, the position of the edge 640 can be lowered, that is, the electronic card 600 can be lowered, due to the reduction of the vertical dimension h of the reinforcing foot 310.

Exemplarily, as shown in FIGS. 3A-3B and FIGS. 9-10, the reinforcing foot 310 may have a limit surface 311 facing the mating face 101. The limit surface 311 may be configured to contact the edge 640 of the electronic card 600 in the slot 130 to lift up the electronic card 600 during the unlocking process. When the latch 200 is in the locked position, the limit surface 311 is closer to the mating face 101 than the engaging surface 131. In other words, the limit surface 311 of the reinforcing foot 310 may be slightly higher than the engaging surface 131 in the locked position. After the electronic card 600 is inserted in place into the slot 130, the edge 640 of the electronic card 600 may sit on the limit surface 131 of the reinforcing foot 310, thus the reinforcing foot 310 may be configured to support the edge 640 of the electronic card 600 to make the electronic card 600 more stable in use. Further, because the electronic card 600 is pressed against the reinforcing foot 310, the latch 200 can be prevented from accidentally being pivoted to the unlocked position.

A vertical distance D from the limit surface 311 to the mounting face 102 is mainly determined by the aforesaid vertical distance C from the engaging surface 131 to the mounting face 102. In the case where the vertical distance C can be effectively reduced, the vertical distance D between the limit surface 311 to the mounting face 102 can also be less than or equal to the predetermined value under JEDEC.

Exemplarily, as shown in FIGS. 9-10, the latch reinforcing member 300 may further comprise a support portion 320, a first curved portion 330 and a second curved portion 340. The support portion 320 may have a first end 321 and a second end 322 disposed opposite each other along the vertical direction Z-Z. The first end 321 may be adjacent to the mating face 102. The second end 322 may be adjacent to the mounting face 102. The first end 321 is closer to the mating face 102 than the second end 322, and the second end 322 is closer to the mounting face 102 than the first end 321. The first curved portion 330 and the second curved portion 340 may be curved from the first end 321 and the second end 322, respectively, toward the slot 130. The reinforcing foot 310 may be connected to the end of the second curved portion 340 away from the support portion 320. The first curved portion 330 may be at least partially disposed in the latch head 210. With this configuration, the latch reinforcing member 300 may extend within the latch 200 along the longitudinal direction Z-Z, thereby increasing the mechanical strength of the latch 200 including, for example, the mechanical strength of the latch head 210 and the latch tail 220, and the mechanical strength of the latch body 230 connected between the latch head 210 and the latch tail 220. As a result, the latch 200 has a better bending resistance along both the longitudinal direction X-X and the transverse direction Y-Y, which ensures the structural stability of the latch 200. Accordingly, the latch 200 can be stably held on the insulating housing 100, and the latch 200 is unlikely to shake in use. Exemplarily, the support portion 320 may extend substantially along the vertical direction Z-Z. Where the latch 200 is in the locked position, the end of the first curved portion 330 away from the support portion 320 may substantially extend along the longitudinal direction X-X. The end of the first curved portion 330 close to the support portion 320 may substantially extend obliquely. The reinforcing foot 310 may also substantially extend along the longitudinal direction X-X. The second curved portion 340 may extend obliquely between the reinforcing foot 310 and the support portion 320. With this configuration, the support portion 320 has a simpler structure, thereby facilitating the processing and reducing manufacturing costs.

Figure 5:
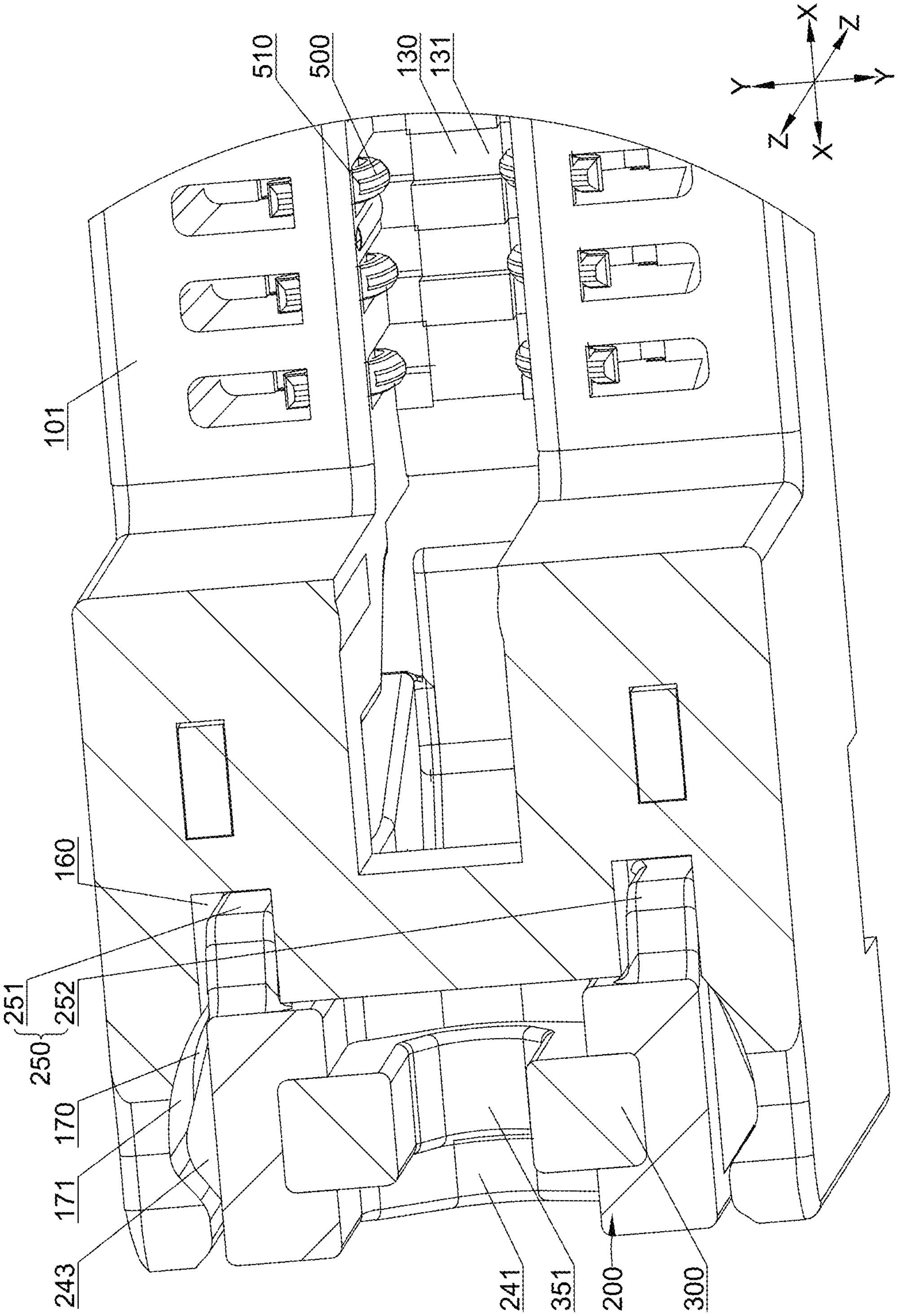
FIG. 5 is a partial cross-sectional view of the card edge connector as shown in FIG. 4 taken by a plane perpendicular to a vertical direction.

Exemplarily, as shown in FIGS. 9-10, a first through-hole 351 may be provided in the support portion 320. A second through-hole 241 may be provided in the latch 200. The first through-hole 351 and the second through-hole 241 may be aligned with each other. The second through-hole 241 is configured to expose the first through-hole 351. Although in the illustrated embodiment, there is only one first through-hole 351, in other embodiments not shown, the first through-holes 351 may also be multiple. When multiple first through-holes 351 are provided, the second through-holes 241 may be disposed in one-to-one correspondence with the first through-holes 351, or only one second through-hole 241 may be provided. When the latch 200 is in the locked position, both the first through-hole 351 and the second through-hole 241 can be aligned with the slot 130, as shown in FIG. 3A. In the case of higher data rates, the electronic system generates more heat in working state. However, the circuits in the circuit board are getting denser, and the gap between the adjacent electrical connectors is small or virtually unset, which is not conducive to heat dissipation. In particular, where a plurality of card edge connectors are typically arranged side by side along the transverse direction Y-Y and close to one another on the mainboard, heat dissipation mainly depends on the ventilation along the longitudinal direction X-X. In this case, heat can be dissipated through the first through-hole 351 and the second through-hole 241, and that is, the first through-hole 351 and the second through-hole 241 together form a heat dissipation through-hole. This ensures that the card edge connector cannot be damaged due to overheating. The first through-hole 351 may be a long hole and is as long as possible along the vertical direction Z-Z. As shown in FIG. 3A, the upper end of the first through-hole 351 may be substantially as high as that of the tower 120. As the lower portion of the latch 200 is narrow, the lower end of the first through-hole 351 may extend to and stop at the narrowed position. Optionally, the dimension of the first through-hole 351 along the transverse direction Y-Y may be substantially equivalent to the transverse dimension of the slot 130, as shown in FIG. 5, to improve heat dissipation effect.

Exemplarily, the first through-hole 351 and the second through-hole 241 may be concentric, as shown in FIGS. 9-10. The second through-hole 241 may be larger than the first through-hole 351. The edge of the first through-hole 351 may be exposed within the second through-hole 241 and the size of the heat dissipation through-hole formed by the first through-hole 351 and the second through-hole 241 together may depend on the size of the first through-hole 351. The mechanical strength of the latch 200 can be further improved, since the latch reinforcing member 300 has comparatively higher mechanical strength. As mentioned above, the latch reinforcing member 300 may be made of a metallic material, which has not only higher mechanical strength but also better thermal conductivity. Where the second through-hole 241 exposes the latch reinforcing member 300, heat can be rapidly transferred from the exposed part of the latch reinforcing member 300 to the entire latch reinforcing member 300, which in turn is radiated off via the entire latch 200. The entire surface of the latch 200 becomes a heat dissipation surface, and the efficiency of heat dissipation is increased. Furthermore, the amount of material to make the latch 200 can be moderately reduced since the latch reinforcing member 300 has already structurally strengthened the latch 200. In other words, the amount of material configured to make the latch 200 can be reduced by increasing the dimension of the second through-hole 241, thereby reducing costs.

Exemplarily, as shown in FIG. 3A and FIGS. 9-10, the end of the first curved portion 330 away from the support portion 320 may be disposed above the tower 120 when the latch 200 is in the locked position. Since the part of the latch 200 above the tower 120 (i.e., the transverse rib 211) may be configured to hold the electronic card 600, the first curved portion 330 extending above the tower 120 may extend into the transverse rib 211, as shown in FIG. 3A. With the first curved portion 330, the transverse rib 211 may have a higher mechanical strength. The transverse rib 211 is inserted into the notch 610. In this way, the reliability of holding the electronic card 600 can be increased.

Exemplarily, as shown in FIG. 3A and FIGS. 9-10, a third through-hole 352 may be disposed in the first curved portion 330. As shown, the upper portion of the latch 200 has a greater transverse dimension as compared to its lower portion, so that sufficient space can be left for the third through-hole 352 in the first curved portion 330. The third through-hole 352 may reduce the amount of material used to make the latch reinforcing member 300, which not only reduces costs but also causes weight reduction. When the latch 200 is formed on the latch reinforcing member 300 by overmolding, the material used to make the latch 200 flows into the third through-hole 352 and fills in the third through-hole 352 to form a filling part 121 shown in FIG. 3A.

Figure 6:
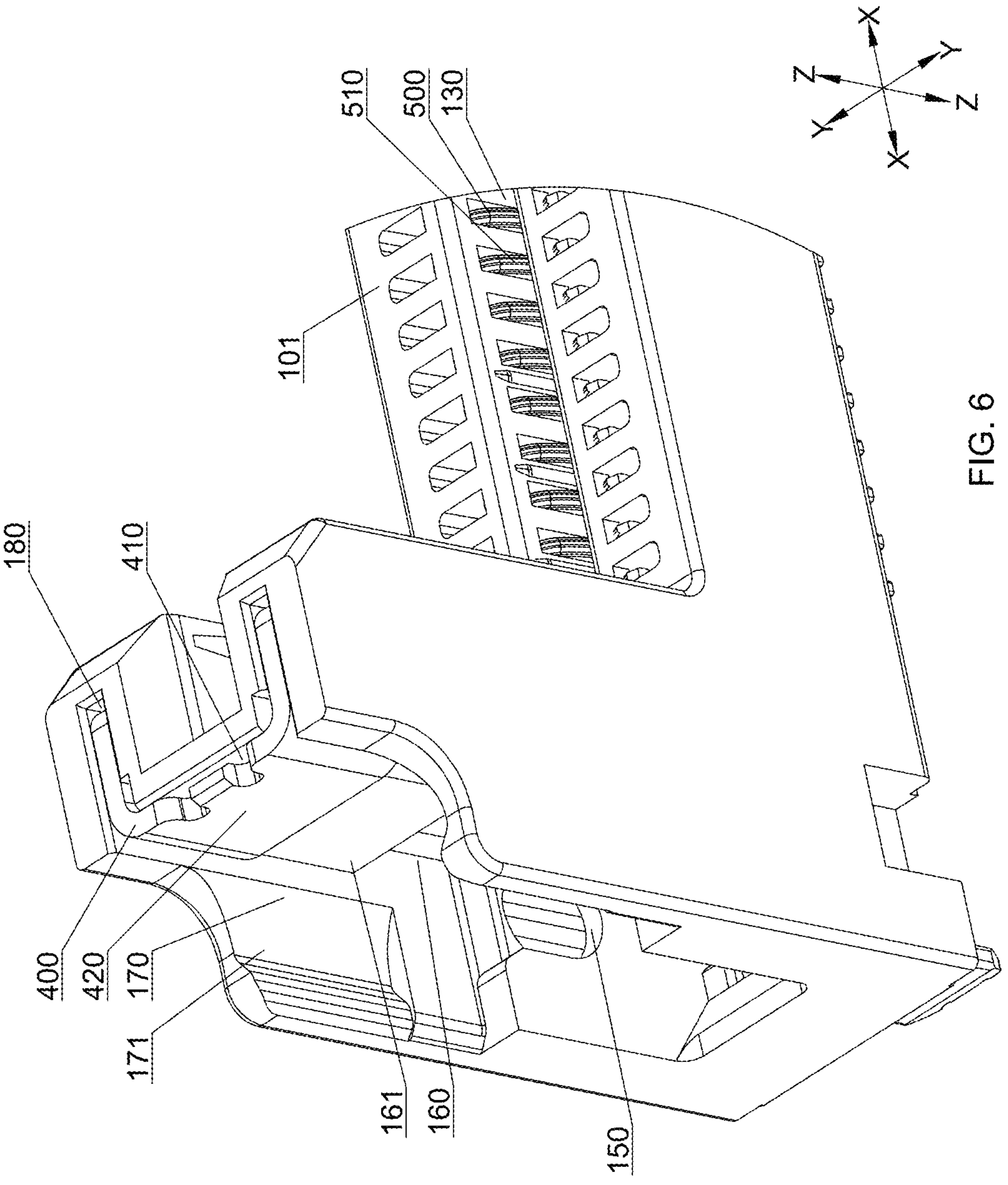
FIG. 6 is a partial perspective view of the card edge connector as shown in FIG. 4, wherein a latch and a latch reinforcing member are hidden.
Figure 8:
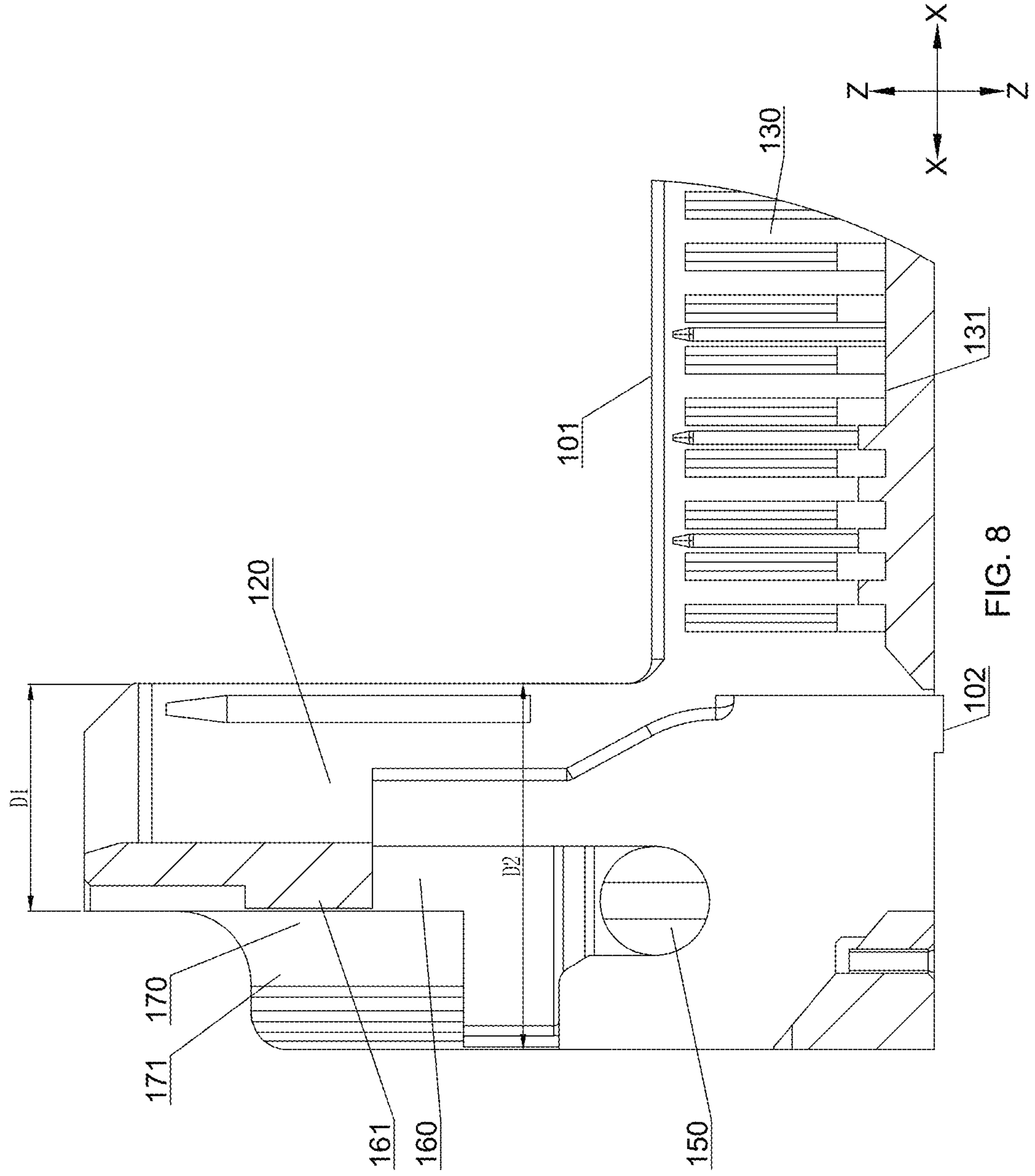
FIG. 8 a partial cross-sectional view of the insulating housing of the card edge connector as shown in FIG. 4 taken by a plane perpendicular to a transverse direction.

Exemplarily, as shown in FIGS. 9-10, the latch 200 may be provided with a hub 242. The hub 242 may extend from a side of the latch 200 along the transverse direction Y-Y. As shown in FIGS. 6 and 8, a hole 150 may be provided in the insulating housing 100. The hub 242 may be connected into the hole 150 such that the latch 200 is pivotally connected to the insulating housing 100. The latch reinforcing member 300 may further comprise a hub 353 disposed on the support portion 320. The hub 353 may be at least partially disposed in the hub 242. In this way, the latch reinforcing member 300 increases the mechanical strength of the hub 242, thereby ensuring the pivoting stability of the latch 200.

Exemplarily, as shown in FIGS. 9-10, the latch reinforcing member 300 may further comprise a rib 354 protruding from the support portion 320 toward the slot 130. The rib 354 may be perpendicular to the vertical direction Z-Z. The hub 353 may be disposed at the end of the rib 354. The rib 354 provides support for the hub 353 and makes the hub 353 structurally stronger.

Optionally, the latch reinforcing member 300 may be made by powder metallurgy. The powder metallurgy is known to those skilled in the art and the improvements in this disclosure do not lie in the process itself. To avoid confusion, no detail in this regard will be described herein. The latch reinforcing member 300 made by the powder metallurgy may have a more complicated structure, such as having the third through-hole 352 or the hub 353 and so on. As a result, the latch reinforcing member 300 may be better adapted to actual use requirements, thereby providing a better experience.

Figure 12:
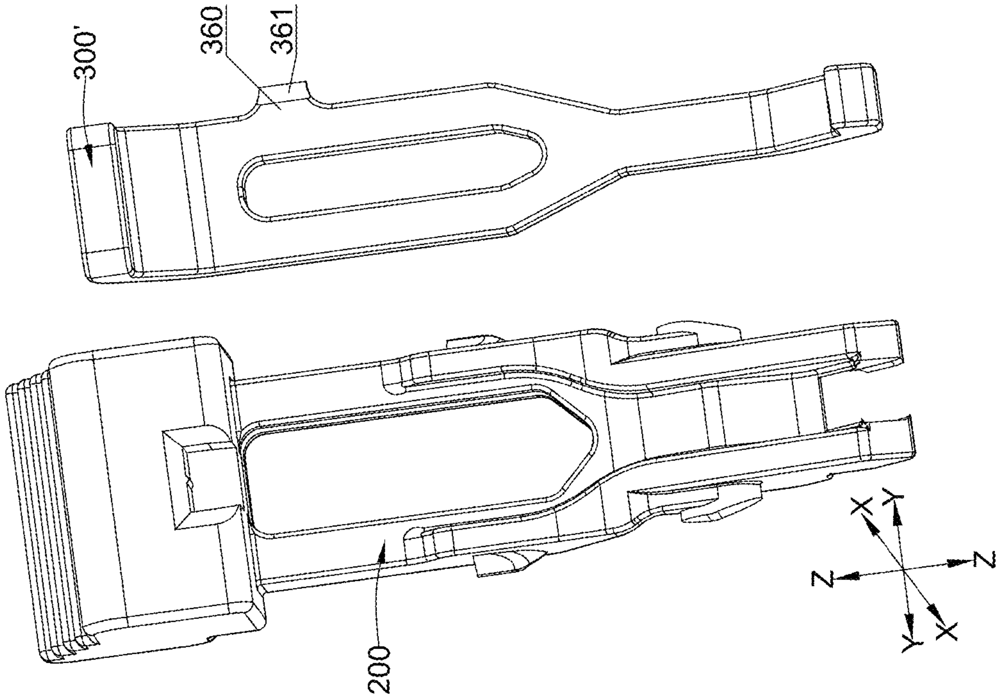
FIG. 12 is an exploded view of the latch and latch reinforcing member of the card edge connector as shown in FIG. 11.
Figure 11:
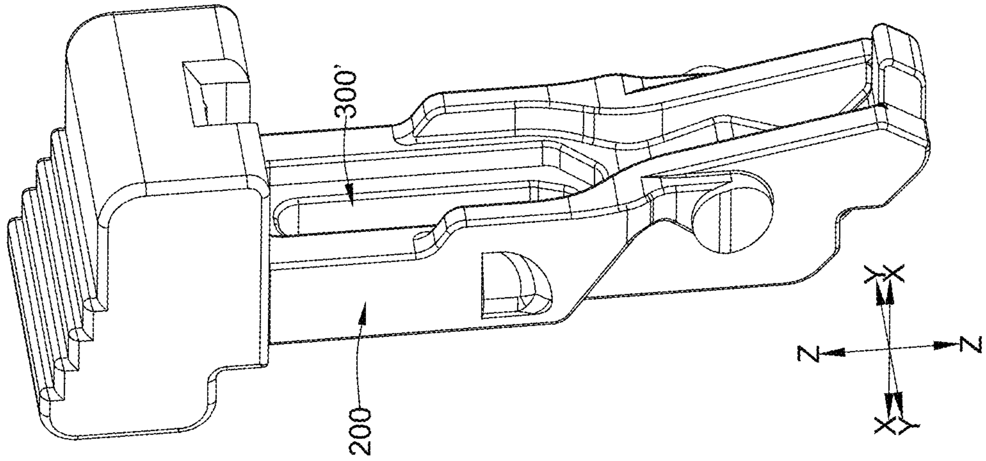
FIG. 11 is a perspective view of a latch and a latch reinforcing member of a card edge connector according to another exemplary embodiment of the present disclosure.

Optionally, a latch reinforcing member 300' may be made by stamping, as shown in FIGS. 11-12. The stamping is known to those skilled in the art and the improvements in the present disclosure do not lie in the process itself. To avoid confusion, no detail in this regard will be described herein. The processing difficulty is relatively lower as the latch reinforcing member 300' is obtained by stamping. Optionally, in this embodiment, the latch reinforcing member 300' may be provided with a projection 360 protruded outwardly. An distal end 361 of the projection 360 may have a V-shaped structure with an opening toward the center of the latch reinforcing member 300'. The V-shaped structure may be referred to as a V-cut. In this way, a plurality of latch reinforcing members 300' may be made in a single pass by stamping. The plurality of latch reinforcing members 300' may be separated at the V-cut as needed. It may also be convenient for subsequent insert molding process by providing the projection 360.

Exemplarily, as shown in FIGS. 9-10, the latch 200 may also include the latch body 230. The latch body 230 may be disposed between the latch head 210 and the latch tail 220. the latch body 230 may include a first latch body portion 231, a second latch body portion 232, and a third latch body portion 233. The first latch body portion 231 may be connected to the latch head 210. The second latch body portion 232 may be connected to the latch tail 220. The third latch body portion 233 may be disposed between the first latch body portion 231 and the second latch body portion 232.

The second latch body portion 232 and the third latch body portion 233 may be provided with an extension 250 extending toward the slot 130. The tower 120 of the insulating housing 100 may be provided with an inner cavity 160, as shown in FIGS. 5-8. The extension 250 may engage with the inner cavity 160 when the latch 200 is in the locked position. The inner cavity 160 may have a pair of inner side walls spaced apart along the transverse direction Y-Y. In this way, the pair of inner side walls of the inner cavity 160 may limit the extension 250 along the longitudinal direction X-X in position, thereby limiting the latch 200. The latch 200 can thus be held more firmly in the locked position, and thus a good holding force can be applied to the electronic card 600 to avoid accidental unlocking of the latch 200. Moreover, the pair of inner side walls of the inner cavity 160 may also act as a clamping effect on the extension 250 along the transverse direction Y-Y, thereby limiting the latch 200 along the transverse direction Y-Y and avoiding the shaking of the latch 200 on the insulating housing 100 along the transverse direction Y-Y.

Exemplarily, the extension 250 may extend from both the second latch body portion 232 and the third latch body portion 233 along the longitudinal direction X-X toward the body 110. Thus, the vertical dimension of the extension 250 can be increased. As shown in FIGS. 9-10, the extension 250 substantially runs across the second latch body portion 232 and the third latch body portion 233. Correspondingly, the inner cavity 160 is adapted to the extension 250. The extension 250 is substantially perpendicular to the second latch body portion 232 and the third latch body portion 233.

In this way, the extension 250 will not obstruct the passage of airflow. Since the extension 250 is provided on both the second latch body portion 232 and the third latch body portion 233, it can be of sufficient dimension to ensure the strength of the engagement with the tower 120 and provide a better limiting effect.

Exemplarily, an outer cavity 170 may also be provided in the tower 120 as shown in FIGS. 5-8. The outer cavity 170 may be disposed on a side of the inner cavity 160 away from the slot 130. The outer cavity 170 may be recessed inward from the end surface of the tower 120 along the longitudinal direction X-X. The outer cavity 170 may pass all the way through to the top of the tower 120. The outer cavity 170 may have a pair of inner side walls spaced apart along the transverse direction Y-Y. A locking portion 171 may be provided on the inner side wall of the outer cavity 170. A protrusion 243 may be provided on the outer side wall of the third latch body portion 233. When the latch is in the locked position, the locking portion 171 and the protrusion 243 may be locked with each other. One from the locking portion 171 and the protrusion 243 may be a bulge, and the other may be a recess. In this way, the locking portion 171 may limit the position of the protrusion 243 along the longitudinal direction X-X, and thereby the latch 200 is held in position. In this way, the latch 200 can be held more firmly in the locked position for applying a great holding force to the electronic card 600.

Exemplarily, when the latch 200 is in the locked position, the first latch body portion 231 may abut against the tower 120 along the extension direction of the slot 130 (i.e., the longitudinal direction X-X). That is, the sum of the longitudinal dimension of the first latch body portion 231 and the longitudinal dimension D1 of the upper portion of the tower 120 determines the total longitudinal dimension D2 of the tower 120, as shown in FIG. 8. And the total longitudinal dimension D2 of the tower 120 is required to meet the JEDEC specifications. That is, the total longitudinal dimension D2 of the tower 120 is usually fixed, and for different types of card edge connections, there are corresponding reference standards. Since the latch reinforcing member 300 is provided in the latch 200, the longitudinal dimension of the latch 200 can be reduced, so that the longitudinal dimension D1 of the upper portion of the tower 120 can be correspondingly increased. As shown in FIG. 8, the outer side of the upper portion of the tower 120 needs to be provided with the outer cavity 170 accommodating the upper portion of the latch 200. The pair of side walls of the outer cavity 170 are separated from each other and not connected to each other, and they are only connected to the pair of side walls of the inner cavity 160, respectively. In this case, the pair of side walls of the outer cavity 170 are more likely to be deformed. In the application of Surface Mounted Technology (SMT), the conductive elements 500 mounted in the insulating housing 100 may be connected to the mainboard by reflow soldering. Thereby, the card edge connector is secured to the mainboard and the conductive elements 500 are interconnected with the circuits in the mainboard. The inventors have recognized that in the process of reflow soldering, the pair of side walls of the outer cavity 170 in the insulating housing 100 are easily deformed by heat during the soldering process. The larger the longitudinal dimension of the outer cavity 170, the easier it is deformed during the soldering process. The main structure that locks the latch 200 to the tower 120 relies on the locking portion 171 on the side wall of the outer cavity 170, and the deformation will cause the locking between the latch 200 and the tower 120 to be weak. Even if the two can be locked together, the latch 200 may sway inside the outer cavity 170. The shortening of the longitudinal dimension of the latch 200 means that the longitudinal dimension of the pair of side walls of the outer cavity 170 becomes less, which will cause the benefits contrary to the various defects mentioned above. Moreover, correspondingly, the longitudinal dimension of the upper portion of the tower 120 can be increased. This brings even more significant benefits. In addition to the outer cavity 170 disposed on the outer side, the upper portion of the tower 120 is provided with the slot 130 on the inner side, which may result in a weaker structure of the upper portion of the tower 120. It is precisely the weaker structure that has to play a role of holding the electronic card in position, and it is the reason for providing a tower reinforcing member 400 in the upper portion of the tower 120. When the longitudinal dimension of the upper portion of the tower 120 can be increased to a certain extent, the benefits are significant, not only in terms of keeping the structural solidity, but also having sufficient space to configure the tower reinforcing member 400.

Optionally, the dimension of the first latch body portion 231 along the extension direction of the slot 130 may be less than or equal to 2.5 mm. Exemplarily, the dimension of the first latch body portion 231 may be 2.5 mm, 2.4 mm, 2.3 mm, or even less.

Exemplarily, the second latch body portion 232 is pivotably connected to the tower 120. The hub 242 may be disposed on the second latch body portion 232. In order that the lower portion of the outer cavity 170 of the tower 120 has sufficient thickness to allow disposing the hole 150 connected to the hub 242, the transverse dimension of the second latch body portion 232 may be less than that of the first latch body portion 231. The third latch body portion 233 is transitionally connected between the first latch body portion 231 and the second latch body portion 232 in the transverse dimension.

Exemplarily, as shown in FIGS. 9-10, the support portion 320 may comprise a first support subportion 323, a second support subportion 324 and a third support subportion 325. The first support subportion 323 may be at least partially disposed in the first latch body portion 231. The first support subportion 323 may be connected to the first curved portion 330. The second support subportion 324 may be at least partially disposed in the second latch body portion 232. The second support subportion 324 may be connected to the second curved portion 340. The third support subportion 325 may be at least partially disposed in the third latch body portion 233. The third support subportion 325 may be connected between the first support subportion 323 and the second support subportion 324. The first support subportion 323 and the third support subportion 325 may have widths (i.e., transverse dimensions) greater than the second support subportion 324. The second support subportion 324 may have the same width as the reinforcing foot 310.

Exemplarily, the part of the third support subportion 325 that is connected to the second support subportion 324 has the reduced dimension along the direction toward the second support subportion 324. With this configuration, the support portion 320 has a smoother profile, thereby being easier to machine and manufacture.

Exemplarily, as shown in FIGS. 6-8 and FIG. 13, the card edge connector may further include the tower reinforcing member 400. The tower reinforcing member 400 may be disposed in the tower 120. Optionally, the tower reinforcing member 400 may be disposed in only one tower 120; or the tower reinforcing members 400 may be disposed in the two towers 120. Ideally, the two towers 120 each is provided with the tower reinforcing member 400. The tower reinforcing member 400 may be made of a material with greater mechanical strength, such as plastic, ceramic, metal, etc. Preferably, the tower reinforcing member 400 is made of metallic material. The metallic material has greater plastics strength, and the material and the processing are less expensive. Preferably, the tower reinforcing member 400 is a one-piece metallic member. In this way, the tower reinforcing member 400 has higher mechanical strength, simple processing technique and low cost.

By disposing the tower reinforcing member 400 in the tower 120, the tower 120 can be strengthened to enhance the impact resistance of the tower 120. In particular, in the card edge connector, the longitudinal dimension of the entire insulating housing 100 is significantly greater than the transverse dimension. When the tower 120 suffers from an impact force along the transverse direction Y-Y, it is prone to deformation or cracking. For the card edge connector with a narrow latch, the strength of the tower 120 is poorer, and thus the tower reinforcing member 400 is much more important.

Along the vertical direction Z-Z, the tower reinforcing member 400 may be positioned between the inner cavity 160 and the mating face 101. A groove 180 may be disposed in the tower 120. The groove 180 may extend from the mating face 101 toward the mounting face 102. The groove 180 may be in communication with the outer cavity 170. In this way, the tower reinforcing member 400 can be inserted into the groove 180 at a plurality of angles (for example, along the vertical direction Z-Z or the longitudinal direction X-X). At the above-mentioned angles, the tower reinforcing member 400 can be inserted into the groove 180 with a larger operating space, which may facilitate the operation and bring about a better experience. It also facilitates the check whether the tower reinforcing member 400 is properly inserted into the groove 180.

The insulating housing 100 and the tower reinforcing member 400 may be manufactured separately and then assembled together, thereby facilitating the manufacturing and mounting, and reducing the cost of the card edge connector.

Optionally, the tower reinforcing member 400 may also be mounted into the tower 120 not by means of plug-in, but by enclosing the tower reinforcing member 400 in the tower 120 when the insulating housing 100 is molded. However, this may result in higher costs for molds of the insulating housing 100.

In FIG. 3A, the latch is in the locked position, and the tower reinforcing member 400 is wrapped by the corresponding latch 200 and tower 120. Thus, it is ensured that the tower reinforcing member 400 is not contaminated by external dirt and other dirt, and its structural strength is guaranteed, thereby better protecting the tower 120.

The tower reinforcing member 400 may be of a U shape. The slot 130 may extend into an opening 410 of the U shape. The tower reinforcing member 400 may semi-enclose the end of the slot 130 in the longitudinal direction X-X. In the embodiment where both two towers 120 are provided with the tower reinforcing members 400, the two tower reinforcing members 400 semi-enclose both ends of the slot 130 in the longitudinal direction X-X, respectively. When the electronic card 600 is inserted into the slot 130, the tower reinforcing members 400 are able to maintain the shape of the tower 120 from both sides of the electronic card 600 along the transverse direction Y-Y, avoiding deformation or cracking of the tower 120 when the electronic card 600 is impacted by an external force. Thus, the tower reinforcing member 400 has a simple structure, and can improve the mechanical strength of the slot 130 and prevent the slot 130 from deformation or cracking.

Exemplarily, the inner cavity 160 may be in communication with the slot 130. A first extension 251 and a second extension 252 may be spaced apart from each other. The first extension 251 and the second extension 252 may be disposed on both sides of the slot 130, respectively. The space between the first extension 251 and the second extension 252 may, serving as a ventilation channel, be in communication with the first through-hole 351 and the second through-hole 241.

Exemplarily, the U shape may have a bottom portion 420 opposite the opening 410. The bottom portion 420 may face the latch 200. The bottom portion 420 may be exposed outside the tower 120. An outer side surface of the inner cavity 160 facing the latch 200 is provided with a step 161. The bottom portion of the U shape may sit on the step 161. The step 161 may be between the ends of the first extension 251 and the second first extension 252 facing the mating face 101. With this configuration, the tower reinforcing member 400 can be more firmly fixed into the tower 120. And, the first extension 251 and the second extension 252 may also protect the tower reinforcing member 400.

Figure 7:
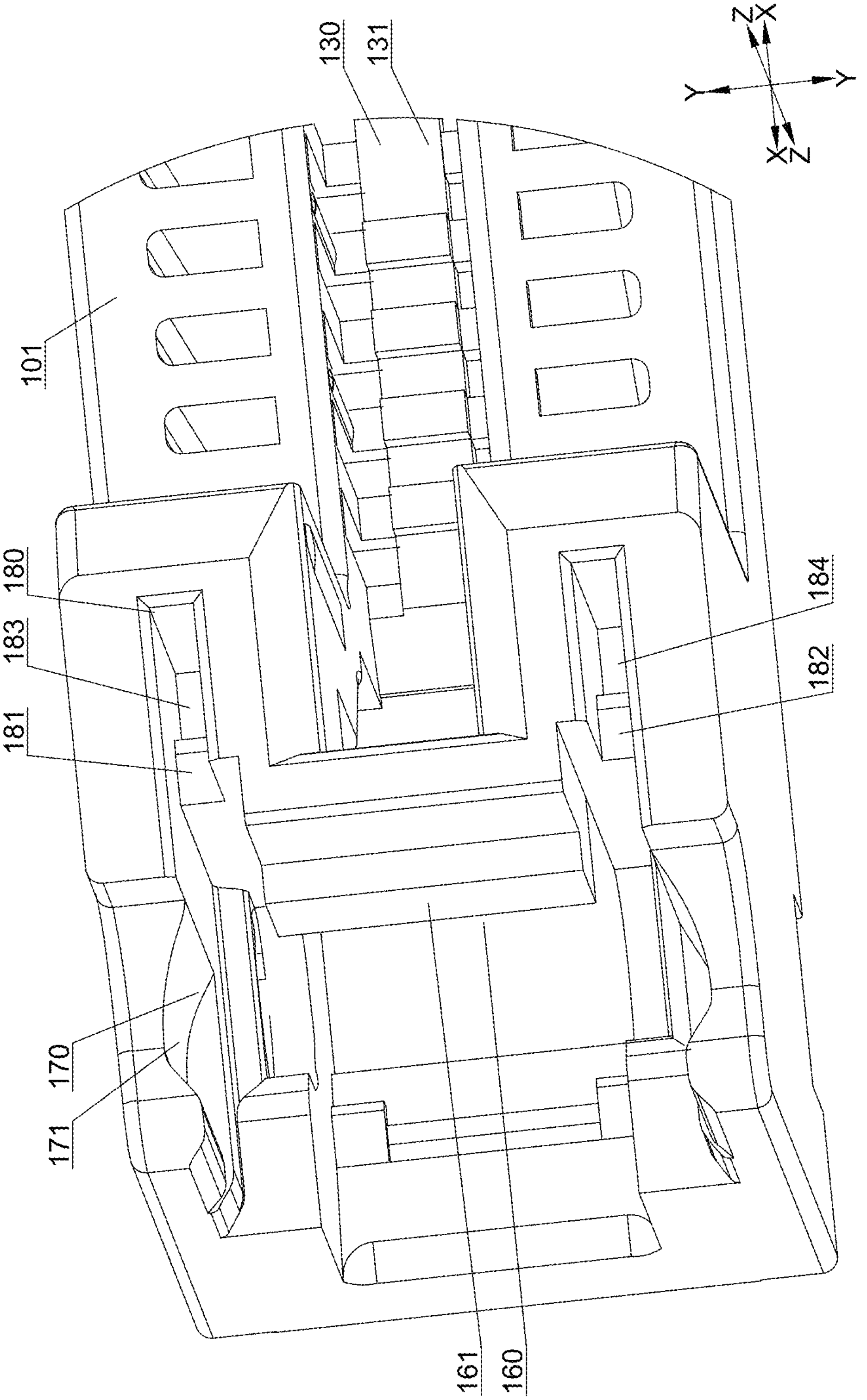
FIG. 7 is a partial perspective view of an insulating housing of the card edge connector as shown in FIG. 4.
Figure 13:
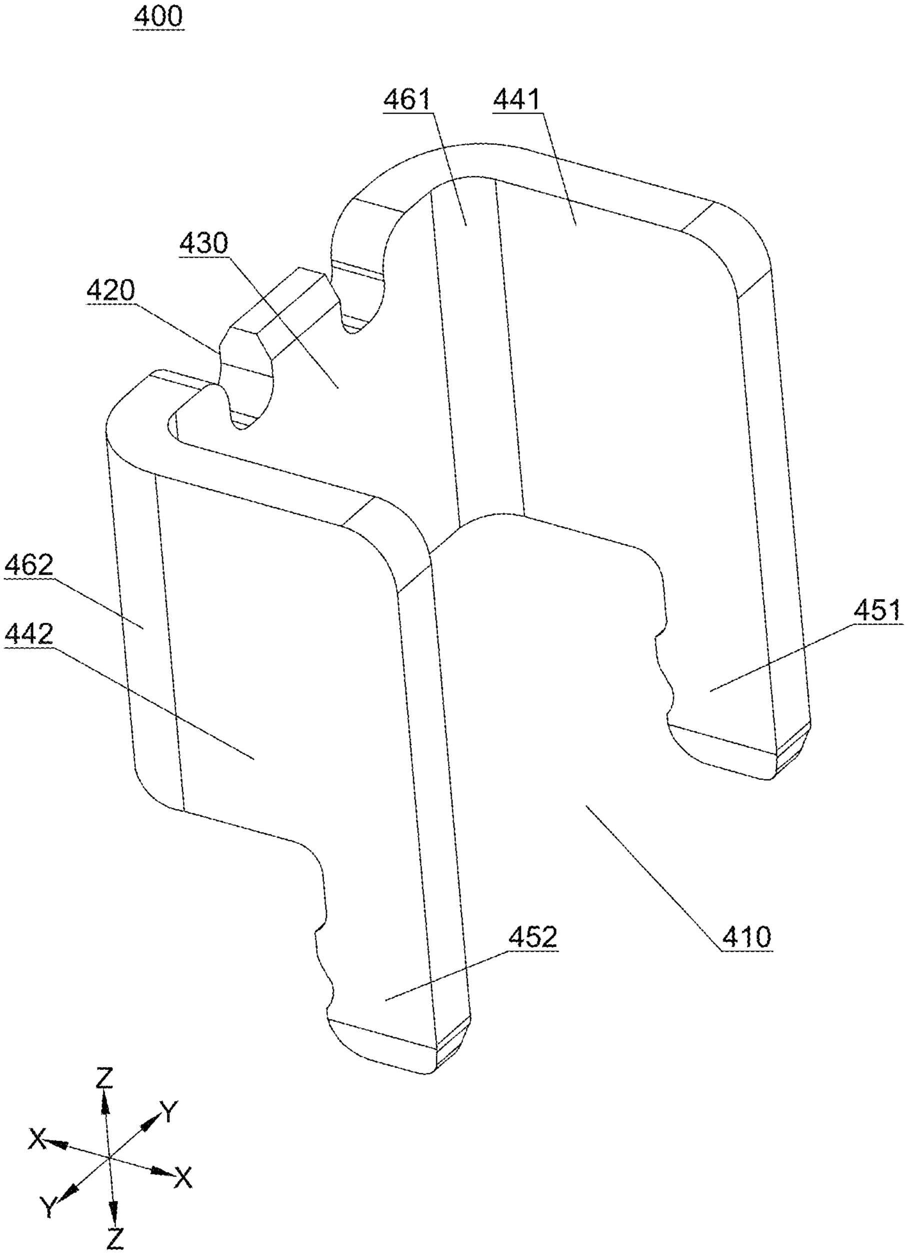
FIG. 13 is a perspective view of a tower reinforcing member of a card edge connector according to an exemplary embodiment of the present disclosure.

Exemplarily, the bottom of the groove 180 may have a first bulge 181 and a second bulge 182, as shown in FIG. 7. The first bulge 181 and the second bulge 182 may be spaced apart along the transverse direction Y-Y. A first recess 183 and a second recess 184 are closer to the interior of the insulating housing 100 than the first bulge 181 and the second bulge 182 along the longitudinal direction X-X, respectively. The first recess 183 and the second recess 184 may or may not penetrate through to the inner cavity 160. The first recess 183 and the second recess 184 may be disposed on both sides of the groove 180 along the transverse direction Y-Y, respectively. The lower portion of the tower reinforcing member 400 may be adapted to the bottom of the groove 180. Correspondingly, the lower portion of the tower reinforcing member 400 may be provided with a first positioning projection 451 and a second positioning projection 452, as shown in FIG. 13. The first positioning projection 451 and the second positioning projection 452 may be inserted into the first recess 183 and the second recess 184, respectively. The first bulge 181 and the second bulge 182 may be the same or different. The first recess 183 and the second recess 184 may be the same or different. By disposing the first recess 183 and the second recess 184, the vertical dimension of the tower reinforcing member 400 can be extended as much as possible to protect the tower 120 from deformation or cracking to a greater extent.

Preferably, the tower reinforcing member 400 may comprise a transverse portion 430, a first longitudinal portion 441 and a second longitudinal portion 442. The transverse portion 430 may extend along the transverse direction Y-Y. The first longitudinal portion 441 and the second longitudinal portion 442 may extend from two end of the transverse portion 430 along the longitudinal direction X-X, respectively. The first longitudinal portion 441 and the second longitudinal portion 442 may be the same or different. The first longitudinal portion 441 and the second longitudinal portion 442 may be spaced apart to form the opening 410 of the U shape. The aforementioned first positioning projection 451 and second positioning projection 452 may be disposed on the first longitudinal portion 441 and the second longitudinal portion 442, respectively.

Optionally, the transverse portion 430 and the first longitudinal portion 441 may be connected by a first arc transition portion 461, as shown in FIG. 13. The transverse portion 430 and the second longitudinal section 442 may be connected by a second arc transition portion 462. The first arc transition portion 461 and the second arc transition portion 462 may have any suitable curvature radius. In this way, the tower reinforcing member 400 is easier to machine-shaping by a single sheet and is less costly to produce.

The present disclosure has been described by the above embodiments, but it should be understood that a variety of variations, modifications and improvements may be made according to the teaching of the present disclosure by those skilled in the art, and all of these variations, modifications and improvements fall within the spirit and the scope of protection of the present disclosure. The scope of protection of the present disclosure is defined by the appended claims and its equivalent scope. The above embodiments are only for the purpose of illustration and description, and are not intended to limit the present disclosure to the scope of the described embodiments.

In the description of the present disclosure, it is to be understood that orientation or positional relationships indicated by orientation words "front', "rear", "upper", "lower", "left", "right", "transverse direction", "vertical direction", "perpendicular", "horizontal", "top", "bottom" and the like usually are shown based on the accompanying drawings, only for the purposes of the ease in describing the present disclosure and simplification of its descriptions. Unless stated to the contrary, these orientation words do not indicate or imply that the specified apparatus or element has to be specifically located, and structured and operated in a specific direction, and therefore, should not be understood as limitations to the present disclosure. The orientation words "inside" and "outside" refer to the inside and outside relative to the contour of each component itself.

Various variations may be made to the structures illustrated and described herein. For example, the card edge connector described above can be any suitable connector, such as a backplane connector, a daughter card connector, a stacking connector, a Mezzanine connector, an I/O connector, a chip socket, a Gen Z connector, etc.

Moreover, although many creative aspects have been described above with reference to vertical connectors, it should be understood that the aspects of the present disclosure are not limited to these. Any one of the creative features, whether alone or combined with one or more other creative features, can also be used for other types of electrical connectors, such as coplanar connectors, etc.

For facilitating description, the spatial relative terms such as "on", "above", "on an upper surface of" and "upper" may be used here to describe a spatial position relationship between one or more components or features and other components or features shown in the accompanying drawings. It should be understood that the spatial relative terms not only include the orientations of the components shown in the accompanying drawings, but also include different orientations in use or operation. For example, if the component in the accompanying drawings is turned upside down completely, the component "above other components or features" or "on other components or features" will include the case where the component is "below other components or features" or "under other components or features". Thus, the exemplary term "above" can encompass both the orientations of "above" and "below". In addition, these components or features may be otherwise oriented (for example rotated by 90 degrees or other angles) and the present disclosure is intended to include all these cases.

It should be noted that the terms used herein are only for describing specific embodiments, and are not intended to limit the exemplary embodiments according to the present application. As used herein, an expression of a singular form includes an expression of a plural form unless otherwise indicated. In addition, it should also be understood that when the terms "including" and/or "comprising" are used herein, it indicates the presence of features, steps, operations, parts, components and/or combinations thereof.

It should be noted that the terms "first", "second" and the like in the description and claims, as well as the above accompanying drawings, of the present disclosure are used to distinguish similar objects, but not necessarily used to describe a specific order or precedence order. It should be understood that ordinal numbers used in this way can be interchanged as appropriate, so that the embodiments of the present disclosure described herein can be implemented in a sequence other than those illustrated or described herein.

What is claimed is:

1. A card edge connector, comprising:

a housing comprising a mating face, a mounting face opposite the mating face in a vertical direction, a slot extending from the mating face toward the mounting face, and an engaging surface disposed in the slot and configured for engaging an edge of an electronic card inserted in the slot;

a latch pivotally connected to the housing between a locked position and an unlocked position, the latch comprising a latch head and a latch tail opposite the latch head in the vertical direction; and a reinforcing member at least partially disposed in the latch, the reinforcing member comprising a foot extending beyond the latch tail and having a mechanical strength greater than that of the latch, wherein a vertical distance from the engaging surface to the mounting face is in a range of 0 to 0.95 mm.

2. The card edge connector of claim 1, wherein the engaging surface is parallel to the mounting face.

3. The card edge connector of claim 1, wherein:

the reinforcing member comprises a support portion having a first end and a second end opposite the first end, a first curved portion extending from the first end of the support portion, and a second curved portion extending from the second end of the support portion;

the first curved portion is at least partially disposed in the latch head; and the foot extends from the second curved portion and away from the support portion.

4. The card edge connector of claim 3, wherein:

the foot of the reinforcing member has a surface facing the mating face and configured to engage the edge of the electronic card inserted in the slot; and when the latch is in the locked position, the surface of the foot of the reinforcing member is disposed between the mating face and the engaging surface in the vertical direction.

5. The card edge connector of claim 4, wherein:

a distance from the surface of the foot of the reinforcing member to the mounting face is less than or equal to a JEDEC predetermined value.

6. The card edge connector of claim 3, wherein:

a vertical dimension of the foot of the reinforcing member is in a range of 0 to 1.0 mm.

7. The card edge connector of claim 3, wherein:

the reinforcing member is made of metal.

8. The card edge connector of claim 1, comprising:

a plurality of conductive elements held by the housing, each of the plurality of conductive elements comprising a mating end curving into the slot, a mounting end extending beyond the mounting face, and an intermediate portion joining the mating end and the mounting end.

9. The card edge connector of claim 3, wherein:

the latch comprises a latch body joining the latch head and the latch tail, the latch body comprises:

a first latch body portion connected to the latch head, a second latch body portion connected to the latch tail, and a third latch body portion joining the first latch body portion and the second latch body portion;

latch extensions extend from the second latch body portion and the third latch body portion toward the slot; and the latch extensions are configured to engage an inner cavity of the housing when the latch is in the locked position.

10. A latch assembly for a card edge connector, the latch assembly comprising:

a latch, the latch comprising a latch head, a latch tail opposite the latch head, a first pair of hubs, and a latch body joining the latch head and the latch tail; and a reinforcing member at least partially disposed in the latch, the reinforcing member comprising a foot extending beyond the latch tail, the reinforcing member comprising a support portion, a second pair of hubs disposed on the support portion, and a rib connecting the second pair of hubs, wherein:

the second pair of hubs of the reinforcing member are at least partially disposed in respective ones of the first pair of hubs of the latch;

the reinforcing member has a mechanical strength greater than that of the latch; and the reinforcing member has a thermal conductivity greater than that of the latch.

11. The latch assembly of claim 10, wherein:

the reinforcing member comprises the support portion having a first end and a second end opposite the first end, a first curved portion extending from the first end of the support portion, and a second curved portion extending from the second end of the support portion;

the first curved portion is at least partially disposed in the latch head; and the foot extends from the second curved portion and away from the support portion.

12. The latch assembly of claim 11, wherein:

the support portion of the reinforcing member comprises a first through-hole; and the latch comprises a second through-hole aligned with the first through-hole such that the first through-hole and the second through-hole are aligned with a slot of the card edge connector when the latch is in a locked position.

13. The latch assembly of claim 12, wherein:

the first curved portion of the reinforcing member comprises a third through-hole.

14. The card edge connector of claim 3, wherein:

the latch comprises a first pair of hubs;

the reinforcing member comprises a second pair of hubs disposed on the support portion and a rib connecting the second pair of hubs; and the second pair of hubs of the reinforcing member are at least partially disposed in respective ones of the first pair of hubs of the latch.

15. The card edge connector of claim 3, wherein:

the support portion of the reinforcing member comprises a projection extending through a side wall of the latch.

16. A card edge connector, comprising:

a housing having a mating face, a mounting face opposite the mating face in a vertical direction, and a slot extending from the mating face toward the mounting face, the slot elongated in a longitudinal direction perpendicular to the vertical direction;

a latch pivotally connected to the housing between a locked position and an unlocked position; and a reinforcing member at least partially disposed in the latch and comprising a foot extending beyond an end of the latch toward the slot, wherein a vertical dimension of the foot of the reinforcing member is in a range of 0 to 0.95 mm such that a vertical dimension from a seating plane in the slot to the mounting face is in a range of 0 to 0.95 mm.

17. The card edge connector of claim 1, wherein:

a vertical dimension of the foot of the reinforcing member is in a range of 0 to 0.95 mm such that a vertical dimension from a seating plane in the slot to the mounting face is in a range of 0 to 0.95 mm.

18. The card edge connector of claim 16, wherein:

the housing comprises a tower elongated in the vertical direction; and when the latch is in the locked position, the reinforcing member extends above the tower of the housing.

19. The card edge connector of claim 16, wherein:

the housing comprises a hole;

the latch comprises a first hub disposed in the hole of the housing such that the latch is pivotably connected to the housing; and the reinforcing member comprises a second hub at least partially disposed in the first hub of the latch.

20. The card edge connector of claim 16, comprising:

a plurality of conductive elements held by the housing, each of the plurality of conductive elements comprising a mating end curving into the slot, a mounting end extending beyond the mounting face, and an intermediate portion joining the mating end and the mounting end.

* * * * *